United States Patent [19]

Rasshofer et al.

[11] Patent Number: 4,723,032

[45] Date of Patent: Feb. 2, 1988

[54] MODIFIED POLYAMINES AND A PROCESS FOR THEIR PRODUCTION

[75] Inventors: Werner Rasshofer, Cologne; Dieter Dieterich, Leverkusen, both of Fed. Rep. of Germany

[73] Assignee: Bayer Aktiengesellschaft, Leverkusen, Fed. Rep. of Germany

[21] Appl. No.: 437,641

[22] Filed: Oct. 29, 1982

[30] Foreign Application Priority Data

Nov. 12, 1981 [DE] Fed. Rep. of Germany ....... 3144991

[51] Int. Cl.$^4$ ............................................. C07C 125/06
[52] U.S. Cl. ...................................... 560/25; 556/420; 558/265; 560/26; 560/115; 560/158; 560/159
[58] Field of Search .................. 560/25, 26, 115, 158, 560/159; 556/420; 558/265

[56] References Cited

U.S. PATENT DOCUMENTS

| | | | |
|---|---|---|---|
| 2,888,439 | 5/1959 | Simons | 560/26 X |
| 3,044,989 | 7/1962 | Shivers | 260/77.5 |
| 3,184,502 | 5/1965 | Mueller et al. | 260/482 |
| 3,385,829 | 5/1968 | Heydkamp et al. | 260/75 |
| 3,625,871 | 12/1971 | Traubel et al. | 260/2.5 |
| 3,808,250 | 4/1974 | Blahak et al. | 260/455 R |
| 3,836,488 | 9/1974 | Pruitt et al. | 560/25 X |
| 3,865,791 | 2/1975 | Brinkmann | 260/77.5 |
| 3,963,710 | 6/1976 | Aufdermarsh | 560/25 X |
| 3,997,592 | 12/1976 | Aufdermarsh | 560/25 |
| 4,129,741 | 12/1978 | Schmidt et al. | 560/50 |
| 4,153,801 | 5/1979 | Schmidt et al. | 548/312 |
| 4,163,831 | 8/1979 | Gessell | 526/153 |
| 4,169,206 | 9/1979 | Mazanek et al. | 560/50 |
| 4,180,644 | 12/1979 | Marquis et al. | 528/68 |
| 4,224,417 | 9/1980 | Hajek et al. | 560/25 X |
| 4,234,714 | 11/1980 | Earing et al. | 560/25 X |
| 4,386,218 | 5/1983 | Rasshofer et al. | 564/38 |

FOREIGN PATENT DOCUMENTS

| | | |
|---|---|---|
| 61627 | 10/1982 | European Pat. Off. . |
| 2948419 | 8/1981 | Fed. Rep. of Germany . |
| 1033912 | 6/1966 | United Kingdom . |
| 1117494 | 6/1968 | United Kingdom . |

Primary Examiner—Michael L. Shippen
Attorney, Agent, or Firm—Gene Harsh; Joseph C. Gil; Lyndanne M. Whalen

[57] ABSTRACT

Modified polyamines containing carbamates, urethane and/or urea and/or thiourethane groups and having a primary amine content of from 0.1 to 20.2 wt % are produced by (a) mixing an organic isocyanate with a base in the presence of at least one hydrogen-active compound and water and (b) converting the carbamate, urethane and/or urea and/or thiourethane groups to amino groups. The isocyanate starting material has an isocyanate content of from 0.5 to 40 wt. %. The hydrogen-active compound contains a hydroxy and/or amino and/or thiol group. Water is used in a quantity such that one mol of water is present for each isocyanate equivalent. Conversion to form the amino groups is accomplished by treatment with a proton donor and/or thermal decomposition and/or solvent extraction. The polyamines thus-produced are particularly useful in the production of polyurethanes.

13 Claims, No Drawings

MODIFIED POLYAMINES AND A PROCESS FOR THEIR PRODUCTION

BACKGROUND OF THE INVENTION

This invention relates to modified polyamines containing urethane and/or urea and/or thiourethane groups and a process for their production.

It is known that aromatic isocyanates can be converted into primary aromatic amines by acid hydrolysis. However, the conversion is less than complete because the amine formed during hydrolysis further reacts with unreacted isocyanate to form the corresponding urea. This further reaction cannot be suppressed even by using excess strong mineral acid. A fairly recent example of such a process is found in Japanese Patent No. 55 007-827.

German Auslegeschrift No. 1,270,046 describes a process for the production of defined, primary aromatic amines containing polyalkylene glycol ether segments in which reaction products of aromatic diisocyanates or triisocyanates with polyalkylene glycol ethers and/or polyalkylene glycol thioethers (preferably those having molecular weights of from 400 to 4000) are reacted with secondary or tertiary carbinols. The products of this reaction are subsequently subjected to thermal decomposition at elevated temperatures in an inert solvent (optionally in the presence of acid catalysts). Apart from the high decomposition temperature, the disadvantage of this procedure is that flammable, readily volatile alkenes which are explosive in air are formed so that safety measures must be taken. Additionally, the loss of the tert-carbinol component makes the process undesirable from an economic standpoint.

German Auslegeschrift No. 694,152 describes a process for the production of prepolymers containing at least two terminal amino groups in which hydrazine, aminophenyl ethylamine or another diamine is reacted with an NCO-prepolymer of a polyether polyol and polyisocyanate (NCO:NH-ratio=1:1.5 to 1:5). Unreacted amine must be carefully removed in another step because the amine catalyzes the reaction with polyisocyanates thereby shortening processing times significantly.

Another synthesis for polyamines containing urethane groups is described in U.S. Pat. No. 3,385,829. In this disclosed process, NCO-prepolymers containing urethane groups are converted with formic acid into the N-formyl derivatives which are subsequently hydrolyzed to form terminal aromatic amines. The reaction of NCO-prepolymers with sulfamic acid disclosed in German Auslegeschrift No. 1,155,907 yields compounds containing terminal amino groups. Relatively high molecular weight prepolymers containing aliphatic secondary and primary amino groups may also be obtained according to German Auslegeschrift No. 1,215,373 by reacting relatively high molecular weight hydroxyl compounds with ammonia under pressure at elevated temperature in the presence of catalysts. U.S. Pat. No. 3,044,989 teaches that such compounds may be made by reacting relatively high molecular weight polyhydroxyl compounds with acrylonitrile, followed by catalytic hydrogenation. Relatively high molecular weight compounds containing terminal amino groups and urethane groups may also be obtained by reacting NCO-prepolymers with enamines, aldimines or ketimines containing hydroxyl groups, followed by hydrolysis (German Offenlegungsschrift No. 2,546,536 and U.S. Pat. No. 3,865,791).

Another approach to synthesizing aromatic polyamines containing urethane and ether groups is the opening of the ring which occurs in the reaction of isatoic acid anhydride and diols. Polyamines of this type are described, for example, in U.S. Pat. No. 4,180,644 and in German Offenlegungsschriften Nos. 2,019,432; 2,619,840; 2,648,774 and 2,648,825. The poor reactivity of the aromatic ester amines obtained in this way is a disadvantage in most applications.

The reaction of nitroaryl isocyanates with polyols, followed by reduction of the nitro groups to aromatic amino groups, is also known (U.S. Pat. No. 2,888,439). The main disadvantage of this process is the high cost of the reduction step.

It is also known that certain heteroaromatic isocyanic acid esters can be converted into heteroaromatic amines by basic hydrolysis. Unfortunately, the hydrolysis conditions described by H. John in J. Prakt. Chemie 130, 314 et seq and 332 et seq (1931) for two specific, heteroaromatic monoisocyanic acid esters are not only totally unsuitable for the conversion of poly-NCO-compounds into aliphatic and/or aromatic amines, they are also dangerous.

The subject of one of our own proposals (see German Offenlegungsschrift No. 2,948,419) is a multistage process for the production of polyamines by the aqueousalkaline hydrolysis of NCO-prepolymers with excess base, optionally in the presence of inert solvents, to form carbamates. These carbamates are treated with a quantity of mineral acid exceeding the quantity of base in order to decompose the carbamates. Excess acid is neutralized with a base and the polyamines are isolated by phase separation or extraction.

Our own unpublished German Patent Application No. P 30 39 600 describes alkaline hydrolysis in mixtures of water and monofunctional alcohols to form carbamates which are subsequently treated with ion exchange resins instead of mineral acids.

Although the latter two processes represent improvements over the prior art in many respects, there is still room for improvement. New products having improved properties obtained by modification of the polyamines are desirable for many reasons. More particularly, polyamines readily form ureas (through "$H_2O$-extension") instead of carbamates. This urea formation occurs particularly where the NCO:OH$^\ominus$-ratio is in the range from 1.01:1 to 1.2:1. Consequently the products form from compounds which were pre-extended through urea groups. Although the resulting polyamines containing urea groups are valuable for certain applications, a product free from urea groups is generally preferred for reasons of processibility. It would therefore be advantageous to have modified polyamines which will yield a product containing virtually no urea groups. NCO-prepolymers and other NCO-compounds of the type formed for example by reacting NCO-compounds themselves ("dimers" and "trimers") or with polyisocyanates containing urea groups (biurets) etc., usually contain a certain amount of monomeric isocyanate. This monomeric isocyanate is converted into monomeric polyamine (such as tolylene diamine) in our processes described above. For many applications, however, it is necessary or desirable that substantially no free low molecular weight amines be present for physiological reasons and also for reasons of reactivity. Elimination of such free low molecular weight amines may be achieved by subjecting the NCO-compounds containing low molecular weight polyisocyanates to distillation, optionally in vacuo, (for example using a so-called thin-layer evaporator) to remove the diisocyanates. However, this distillation step is rather expensive.

Another way of achieving substantial freedom from monomers is to add monofunctional or polyfunctional hydroxyl compounds after production of the NCO-prepolymer. However, this lengthens the residence time in the reaction vessel and increases costs.

Another problem encountered in the prior art processes is attributable to the fact that for many applications, polyamines containing terminal amino groups of the type obtained by the processes described above are preferably used in admixture with other polyamines containing terminal amino groups (such as aminopolyethers). Such mixtures may, for example, consist of an aminopolyether having a molecular weight in the range from 2000 to 4000 and an aminopolyether having a molecular weight in the range from 300 to 2000. Mixtures of this type may be prepared by mixing two or more of these polyamines with one another if the two polyamines are miscible with and soluble in one another. Such is not always the case, however. In addition, it is economically undesirable to attempt to carry out exactly the same process steps in order to produce one and the same reaction component. Such polyamine mixtures may also be produced by converting mixtures of NCO-prepolymers. In this case, two NCO-prepolymers have to be produced, in addition to which the solubility of the often solid, crystalline NCO-component having the lower molecular weight presents problems.

Polyamine mixtures may also be produced by adding a more NCO-reactive component to a semi-prepolymer which reacts with the excess monomeric polyisocyanate and then reacting the resulting prepolymer mixture with a hydroxyl compound. The disadvantages of this process include the need for a second step and the poor solubility of low molecular weight NCO-prepolymers in the relatively high molecular weight NCO-prepolymers. Crystalline deposit of low molecular weight NCO-prepolymers may be avoided by adding more NCO-reactive component to a relatively high molecular weight NCO-prepolymer so that pre-extension occurs. Apart from the fact that a second reaction step is again necessary, the viscosity of the pre-extended NCO-prepolymer increases. This is a disadvantage to processes such as those described above, which require as low-viscosity an NCO-component as possible, and makes it necessary to use a solvent.

If the alkaline NCO-hydrolysis is carried out in the presence of monofunctional alcohols (in accordance with unpublished German Patent Application No. P 30 39 600), a chain-terminating reaction may occur through the formation of a urethane group, depending upon the NCO- and alcohol-reactivity and the reaction conditions. This is undesirable in most cases.

SUMMARY OF THE INVENTION

It is an object of the present invention to produce modified polyamines containing urethane and/or urea and/or thiourethane groups and having a primary amino group content of from 0.1 to 20.2 wt. %.

It is also an object of the present invention to provide a process for the production of modified polyamines containing urethane and/or urea and/or thiourethane groups having a primary amino group content of from 0.1 to 20.2 wt. %.

It is another object of the present invention to provide a process for the production of modified polyamines from isocyanates which process is a simple one-pot process.

It is a further object of the present invention to provide a process for the production of modified polyamines from materials which are inexpensive and readily available in large quantities.

It is yet another object of the present invention to provide a process for the production of modified polyamines in which the yields are quantitative and the volume/time yield is high.

It is also an object of the present invention to provide a process for the production of modified polyamines in which conventional reaction vessels may be employed without special precautions.

It is still another object of the present invention to provide a continuous process for the production of modified polyamines.

It is another object of the present invention to provide a process for the production of modified polyamines which is environmentally safe because no solvent need be employed, only small amounts of carbon dioxide are released and small amounts of acid salts are formed.

It is also an object of the present invention to provide a process for the production of modified polyamines which are substantially free from monomeric polyamines from low molecular weight isocyanates without preliminarily treating the isocyanates (e.g., by thin layer evaporation).

It is another object of the present invention to provide a one-step process for the production of modified polyamines which may contain different segments attached through urethane groups, thiourethane groups or urea groups (from diol or polyol or diamine or polyamine extension) in one molecule.

It is yet another object of the present invention to provide a process capable of producing a trifunctional or higher polyamine from a lower functional isocyanate compound by using a compound having hydrogen-active groups and a relatively high functionality.

These and other objects which will be apparent to those skilled in the art are accomplished by reacting a compound containing free NCO groups and having an NCO-content of from 0.5 to 40 wt. % with a "base" (as being defined in the Following) in the presence of a compound containing at least two hydrogen-active groups. The polyamines thus-produced contain carbamate groups and/or urethane groups and/or urea groups and/or thiourethane groups. These polyamines may be isolated from the reactants by known techniques such as treatment with a proton donor, thermal treatment or solvent extraction. The modified polyamines produced in this manner are particularly useful in the production of polyurethanes.

DETAILED DESCRIPTION OF THE INVENTION

The present invention relates to modified polyamines containing primary aromatic and/or aliphatic and/or cycloaliphatic amino groups and a process for the production thereof. These polyamines are made by hydrolysis of a compound containing free isocyanate groups with a "base" to form a compound containing carbamate groups.

As a "base" according to the invention are used the oxides or hydroxides of the 1. and 2. maingroup of the Periodic Chart of the Elements, low molecular weight silicates or -aluminates and/or quarternary tetraalkylammonium hydroxides as far as they are essentially water soluble.

The compounds containing isocyanate groups may be aromatic, aliphatic or cycloaliphatic and should have an NCO-content of from 0.5 to 40 wt. %. This isocyanate which may be dissolved in an NCO-inert solvent is converted into a compound containing carbamate and/or urethane and/or urea and/or thiourethane groups by mixing with a base in the presence of at least one compound containing two or more aliphatic or aromatic hydroxy and/or amino and/or thiol groups and at least one mol of water for each NCO-equivalent. The modified polyamine may be recovered from the reaction mixture by techniques known to those in the art. Such techniques include treatment with a proton donor, heat treatment and solvent extraction.

The present invention also relates to the use of the polyamines containing aromatic and/or primary $NH_2$- groups obtainable by the process of the present invention for the production of polyurethanes, such as cellular polyurethane plastics and polyurethane foams. Such polyurethanes may be made by reacting polyisocyanates and/or blocked polyisocyanates with the polyamines of the present invention and, optionally, other low molecular weight and/or relatively high molecular weight compounds containing groups reactive to optionally blocked isocyanates, optionally in the presence of auxiliaries and additives known to those in the art.

The NCO-compounds containing two or more aromatic and/or aliphatic and/or cycloaliphatic, free NCO-groups (hereinafter referred to as "NCO-compounds") suitable for use in the process of the present invention may be modified polyisocyanates of the type obtained by conversion of some of the isocyanate groups into urea, biuret, uretdione or isocyanurate groups, or they may be NCO-prepolymers of polyfunctional compounds with NCO-reactive H-groups having a molecular weight of 18, 32 or 60 to 12,000 and (excess) quantities of polyisocyanates or they may be semi-prepolymers of NCO-prepolymers and additional polyisocyanates.

Suitable modified polyisocyanates include polyisocyanates containing urea groups (water modification), of the type described for example in German Pat. No. 1,230,778; polyisocyanates containing biuret groups of the type described in U.S. Pat. Nos. 3,124,605 and 3,201,372 and in British Pat. No. 889,050; polyisocyanates containing isocyanurate groups of the type described in U.S. Pat. No. 3,001,973 and in German Pat. Nos. 1,022,789 and 1,222,067; and dimeric or oligomeric polyisocyanates containing uretdione groups. Numerous uretdione polyisocyanates are mentioned in Analytical Chemistry of the Polyurethanes, Vol. 16/III, High-Polymers-Series (Wiley, 1969).

Modified polyisocyanates containing urea and/or biuret and/or uretdione and/or isocyanurate groups, of the type suitable for use in the process of the present invention, normally have an NCO-content of from 5 to 40 wt. % and preferably from 10 to 25 wt. % and are substantially free from urethane groups. However, the NCO-compounds used in the process of the present invention are preferably NCO-prepolymers which may be obtained in known manner by reacting high molecular weight and/or low molecular weight compounds containing hydroxy and/or amino and/or thiol groups (molecular weight in the range from 60 to about 12,000) with an excess of polyisocyanate and a NCO-content of preferably from 1,2 to 25 wt. %.

Polyisocyanates suitable for use in the production of the compounds containing free NCO-groups are, in principle, any aliphatic, cycloaliphatic, araliphatic, aromatic and heterocyclic polyisocyanates substantially free from hydrolyzable groups, apart from the NCO-groups, of the type described, for example, by W. Siefken in Justus Liebigs Annalen der Chemie, 562, pages 75 to 136. Appropriate polyisocyanates include those corresponding to the formula

Q (NCO)$_n$ in which n=2 to 4, preferably 2, and

Q represents an aliphatic hydrocarbon radical containing from 3 to 18 carbon atoms (preferably from 6 to 10 carbon atoms); a cycloaliphatic hydrocarbon radical containing from 4 to 15 carbon atoms (preferably from 5 to 10 carbon atoms); an aromatic hydrocarbon radical containing from 6 to 15 carbon atoms (preferably from 6 to 13 carbon atoms); or an araliphatic hydrocarbon radical containing from 8 to 15 (preferably from 8 to 13) carbon atoms. Specific examples of such polyisocyanates are: 1,4-tetramethylene diisocyanate; 1,6-hexamethylene diisocyanate; 1,12-dodecane diisocyanate; also cycloaliphatic diisocyanates in the form of mixtures of their position and/or stereoisomers such as cyclobutane-1,3-diisocyanate, cyclohexane-1,3- and 1,4-diisocyanate, 1-isocyanato-3,3,5-trimethyl-5-isocyanatomethyl cyclohexane, 2,4- and 2,6-hexahydrotolylene diisocyanate, hexahydro-1,3- and/or -1,4-phenylene diisocyanate, perhydro-2,4'- and/or -4,4'-diphenylmethane diisocyanate. However, particularly suitable polyisocyanates are aromatic diisocyanates such as 1,3- and 1,4-phenylene diisocyanate; 2,4- and 2,6-tolylene diisocyanate and mixtures of these isomers; diphenylmethane-2,4'- and/or -4,4'-diisocyanate, including its alkyland chlorine-substituted derivatives; and naphthylene-1,5-diisocyanate. Other suitable diisocyanates are the 2,4'-diisocyanatodiphenyl sulfides and 2-(ω-isocyanatoalkyl)-phenyl isocyanates described in German Offenlegungsschrift No. 2,922,966 and the alkyl-substituted diphenylmethane diisocyanates described for example in European Patent Application No. 24,665 and German Offenlegungsschrift No. 2,935,318.

Other suitable polyisocyanates are triphenyl methane-4,4',4''-triisocyanate; polyphenyl polymethylene polyisocyanates of the type obtained by condensing aniline with formaldehyde, followed by phosgenation, (described for example in British Pat. Nos. 874,430 and 848,671); m- and p-isocyanatophenyl sulfonyl isocyanates according to U.S. Pat. No. 3,454,606; perchlorinated aryl polyisocyanates of the type described, for example, in German Auslegeschrift No. 57,601 (U.S. Pat. No. 3,277,138); norbornene diisocyanates according to U.S. Pat. No. 3,492,330; polyisocyanates containing isocyanurate groups of the type described, for example, in U.S. Pat. No. 3,001,973, in German Patent Nos. 1,022,789; 1,222,067; 1,027,394; 1,929,034 and 2,004,048; polyisocyanates containing urethane groups of the type described, for example, in Belgian Patent No. 752,261 or in U.S. Pat. Nos. 3,394,164 and 3,644,457; polyisocyanates containing acylated urea groups according to German Patent No. 1,230,778; and polyisocyanates produced by telomerization reactions of the type described, for example, in U.S. Pat. No. 3,654,196.

It is also possible to use the distillation residues containing isocyanate groups obtained in the commercial production of isocyanates, optionally in solution in one or more of the above-mentioned polyisocyanates. Mixtures of the above-mentioned polyisocyanates may also be used.

In general, it is preferred to use the commercially available polyisocyanates such as 2,4- and 2,6-tolylene diisocyanate, and mixtures of these isomers ("TDI"), polyphenyl polymethylene polyisocyanates of the type produced by condensing aniline with formaldehyde, followed by phosgenation ("crude MDI"), and polyisocyanates containing urethane groups, isocyanurate groups or urea groups ("modified polyisocyanates") (especially modified polyisocyanates of the type derived from 2,4- and/or 2,6-tolylene diisocyanate and from 4,4'- and/or 2,4'-diphenylmethane diisocyanate). Particularly suitable diisocyanates are the tolylene diisocyanates, their technical isomer mixtures and, optionally, their dimers.

Compounds which may be used in the production of NCO-prepolymers include relatively high molecular weight compounds having a molecular weight of from 400 to 12,000 (preferably from 400 to 6000) containing at least two (preferably from 2 to 4, most preferably from 2 to 3) reactive hydroxyl, amino and/or thiol groups (preferably hydroxyl groups) as reactive groups, and free from readily hydrolyzable groups, such as ester groups for example. Suitable compounds of this type are polyacetals, polythioethers, polycarbonates, polyamides, polysiloxanes and/or polybutadienes containing isocyanate-reactive groups which are well known in polyurethane chemistry. Polyethers containing hydroxyl groups are particularly preferred.

The polyethers containing at least 2, generally 2 to 8 and preferably 2 to 3 hydroxyl groups suitable for use in the present invention are known. Such polyethers may be obtained by polymerizing epoxides, such as ethylene oxide, propylene oxide, butylene oxide, tetrahydrofuran, styrene oxide or epichlorohydrin, themselves in the presence of Lewis catalysts (such as $BF_3$) or by the addition of these epoxides (preferably ethylene oxide and propylene oxide, optionally in admixture or successively) with starter components containing reactive hydrogen atoms. Such starter components include water, alcohols, ammonia and amines, such as ethylene glycol, 1,3- or 1,2-propane diol, trimethylol propane, glycerol, sorbitol, 4,4'-dihydroxydiphenyl propane, aniline, ethanolamine or ethylene diamine. Sucrose polyethers and formitol-started or formose-started polyethers may also be used in accordance with the present invention.

Polybutadienes containing OH-, NH- and/or SH- groups may also be used in the practice of the present invention (see Progress Org. Coatings, Vol. 7 (3), 289-329 (1979)).

Suitable polyacetals include compounds obtainable from glycols, such as diethylene glycol, triethylene glycol, 4,4,'-dihydroxy ethoxy diphenyl methane hexane diol and formaldehyde. Polyacetals suitable for use in the present invention may also be obtained by polymerizing cyclic acetals such as, for example, trioxane.

Suitable polycarbonates containing hydroxyl groups are known and can be obtained by reacting diols (such as 1,3-propane diol, 1,4-butane diol and/or 1,6-hexane diol, di-, tri- or tetra-ethylene glycol or thiodiglycol) with diaryl carbonates (for example diphenyl carbonate) or phosgene (German Auslegeschriften Nos. 1,694,080; 1,915,908 and 2,221,751; German Offenlegungsschrift No. 2,605,024).

The polyamides which may be used in the practice of the present invention include the predominantly linear condensates obtained from polybasic, saturated or unsaturated carboxylic acids or their anhydrides and polyfunctional, saturated or unsaturated diamines, polyamines and mixtures thereof.

Among the polythioethers which may be used are the condensation products of thiodiglycol on its own and/or with other glycols.

Polyhydroxyl compounds already containing urethane or urea groups and optionally modified natural polyols may also be used. Addition products of alkylene oxides with phenol-formaldehyde resins or even with urea-formaldehyde resins may also be used in accordance with the present invention.

The above-mentioned polyhydroxyl compounds may be modified in various ways before use. Thus, according to German Offenlegungsschriften Nos. 2,210,839 (U.S Pat. No. 3,849,515) and 2,544,195, a mixture of different polyhydroxyl compounds may be condensed by etherification in the presence of a strong acid to form a relatively high molecular weight polyol which is made up of different segments attached through ether bridges. It is also possible, according to German Offenlegungsschrift No. 2,559,372, to introduce amide groups into the polyhydroxyl compounds.

According to the invention, it is also possible to use polyhydroxyl compounds containing high molecular weight polyadducts and polycondensates or polymers in finely dispersed or dissolved form. Such polyhydroxyl compounds may be obtained by carrying out polyaddition reactions (for example reactions between polyisocyanates and aminofunctional compounds) and polycondensation reactions (for example between formaldehyde and phenols and/or amines) in situ in the above-mentioned compounds containing hydroxyl groups. Processes such as these are described, for example, in German Auslegeschriften Nos. 1,168,075 and 1,260,142 and in German Offenlegungsschriften Nos. 2,324,134; 2,423,984; 2,512,385; 2,513,815; 2,550,756; 2,550,797; 2,550,833; 2,550,862; 2,633,293 and 2,639,254. However, it is also possible according to U.S. Pat. No. 3,869,413 or U.S. Pat. No. 2,550,860 to mix an aqueous polymer dispersion with a polyhydroxyl compound and subsequently to remove the water from the mixture.

Polyhydroxyl compounds modified by vinyl polymers of the type obtained by polymerizing styrene and acrylonitrile in the presence of polyethers (U.S. Pat. Nos. 3,383,351; 3,304,273; 3,523,093 and 3,110,695; German Auslegeschrift No. 1,152,536) or polycarbonate polyols (German Pat. No. 1,769,795; U.S. Pat. No. 3,637,909) are also suitable for use in the process of the present invention. Plastics having particularly good flameproof properties are obtained by using polyether polyols modified in accordance with German Offenlegungsschriften Nos. 2,442,101; 2,644,922 and 2,646,141 by graft polymerization with vinyl phosphonic acid esters and, optionally, (meth)acrylonitrile, (meth)acrylamide or OH-functional (meth)acrylic acid esters. Polyhydroxyl compounds into which carboxyl groups have been introduced by radical graft polymerization with unsaturated carboxylic acids and, optionally, other olefinically unsaturated monomers (German Offenlegungsschriften Nos. 2,714,291; 2,739,620 and 2,654,746) may be used with particular advantage in combination with mineral fillers.

Representatives of the above-mentioned compounds which may be used in the present invention are described for example in High Polymers, Vol. XVI, "Polyurethanes, Chemistry and Technology", by Saunders-Frisch, Interscience Publishers, New York/London, Vol. I, 1962, pages 32–42 and pages 44–54 and Vol. II, 1964, pages 5–6 and 198–199, and in Kunststoff-Handbuch, Vol. VII; Vieweg-Höchtlen, Carl-Hanser-Verlag, Munich, 1966, for example on pages 45 to 71. It is of course possible to use mixtures of the above-mentioned compounds containing at least two isocyanate-reactive hydrogen atoms and having a molecular weight of from 400 to 12,000 (for example mixtures of different polyethers).

Other starting components which may optionally be used in the production of the NCO-prepolymers useful in the process of the present invention are compounds containing at least two isocyanate-reactive hydrogen atoms and having a molecular weight of from 18 to 399, preferably from 60 to 399. Such compounds include those containing water and/or hydroxyl groups and/or amino groups and/or thiol groups (preferably hydroxyl groups) of the type commonly used as chain-extending or cross-linking agents in polyurethane chemistry. These compounds generally contain from 2 to 8, preferably from 2 to 4, isocyanate-reactive hydrogen atoms. It is also possible to use mixtures of different compounds containing at least two isocyanate-reactive hydrogen atoms and having a molecular weight of from 18 to 399.

Specific examples of such compounds are water, ethylene glycol, 1,2- and 1,3-propane diol, 1,4- and 2,3-butylene glycol, 1,5-pentane diol, 1,6-hexane diol, 1,8-octane diol, neopentyl glycol, 1,4-bis-hydroxymethyl cyclohexane, 2-methyl-1,3-propane diol, dibromobutenediol (U.S. Pat. No. 3,723,392), glycerol, trimethylol propane, 1,2,6-hexane triol, trimethylol ethane, pentaerythritol, quinitol, mannitol and sorbitol, dianhydrosorbitol and dianhydromannitol, castor oil, di-, tri- and tetra-ethylene glycol, di-, tri- and tetra-propylene glycol, dibutylene glycol and higher polyethylene, polypropylene or polybutylene glycols having a molecular weight of up to 399, 4,4'-dihydroxy diphenyl propane, dihydroxy methyl hydroquinone, ethanolamine, diethanolamine, N-methyl diethanolamine, triethanolamine aminopropanol.

Other low molecular weight polyols suitable for the present invention are the mixtures of hydroxy aldehydes and hydroxyl ketones ("formose") or the polyhydric alcohols obtained therefrom by reduction ("formitol") which are formed in the autocondensation of formaldehyde hydrate in the presence of metal compounds as catalysts and compounds capable of enediol formation as co-catalysts (German Offenlegungsschriften Nos. 639,084; 2,714,084; 2,714,104; 2,271,186; 2,738,154 and 2,738,512).

It is also possible, although generally less preferred, to use aliphatic diamines, such as ethylene diamine, 1,4-tetramethylene diamine, 1,6-hexamethylene diamine, 1,12-dodecamethylene diamine and mixtures thereof, 1-amino-3,3,5-trimethyl-5-aminomethyl cyclohexane ("isophorone diamine"), 2,4- and 2,6-hexahydrotolylene diamine and mixtures thereof, perhydro-2,4'- and -4,4'-diaminodiphenyl methane, p-xylylene diamine, bis-(3-aminopropyl)-methylamine, diaminoperhydroanthracenes (German Offenlegungsschrift No. 2,638,731) and cycloaliphatic triamines (according to German Offenlegungsschrift No. 2,614,244). Hydrazine and substituted hydrazines, for example methyl hydrazine, may also be used in accordance with the invention.

Examples of aromatic diamines (which are also less preferred as components used in the production of NCO-prepolymers) are the diamines containing ether groups according to German Offenlegungsschriften Nos. 1,770,525 and 1,809,172 (U.S. Pat. Nos. 3,654,364 and 3,736,295); 2-halogen-1,3-phenylene diamines optionally substituted in the 5-position (German Offenlegungsschriften Nos. 2,001,772; 2,025,896 and 2,065,869); 3,3'-dichloro-4,4'-diaminodiphenyl methane; tolylene diamine; 4,4'-diaminodiphenyl methane 4,4'-diaminodiphenyl disulfides (German Offenlegungsschrift No. 2,404,976); diaminodiphenyl dithioethers (German Offenlegungsschrift No. 2,509,404); aromatic diamines substituted by alkyl thio groups (German Offenlegungsschrift No. 2,638,760); aromatic diamines containing sulfonate or carboxylate groups (German Offenlegungsschrift No. 2,720,166) and the high-melting diamines mentioned in German Offenlegungsschrift No. 2,635,400. Examples of aliphatic-aromatic diamines are the aminoalkyl thioanilines according to German Offenlegungsschrift No. 2,734,574.

Other compounds which may be used in the production of the NCO-compounds used in the process of the present invention are polysiloxanes containing two terminal isocyanate-reactive groups and structural units corresponding to the formula $-O-Si(R)_2-$, in which R represents a $C_1-C_4$-alkyl radical or a phenyl radical, but preferably a methyl radical. According to the invention, suitable starting materials are both the known pure polysiloxanes containing terminal organofunctional groups and the known siloxane/polyoxyalkylene copolymers containing terminal organofunctional groups. Organofunctional polysiloxanes suitable for use as a starting material in the present invention are described for example in German Auslegeschriften Nos. 1,114,632; 1,190,176; 1,248,287 and 2,543,638 or in German Offenlegungsschriften Nos. 2,356,692; 2,445,648; 2,363,452; 2,427,273 and 2,558,523. The carbofunctional terminal groups are preferably aliphatic $C_1-C_6$-hydrocarbon radicals optionally containing heteroatoms, (such as oxygen), and at least one hydroxyl, mercapto or primary or secondary amino group. Preferred carbofunctional groups include primary and secondary hydroxyl groups and also primary and secondary amino groups. Starting compounds containing terminal primary hydroxyl groups are most preferred. The carbofunctional groups may be present in the starting materials, for example in the form of the following carbofunctional radicals: $-CH_2OH$, $-(CH_2)_4OH$, $-CH_2-O-CH_2-CH_2-OH$, $-CH_2-S-CH_2-CH_2-OH$, $-CH_2-S-CH_2-CHOH-CH_2OH$, $-CH_2SH$, $-CH_2-S-CH_2-CH_2-SH$, $-CH_2-NH_2$, $-(CH_2)_4NH_2$, $-CH_2-NH-C_4H_9$ or $-CH_2-NH-C_6H_{11}$.

The organofunctional polysiloxanes contain at least 2 (preferably from 6 to 30) structural units corresponding to the formula $-O-Si(R)_2-$ and have a molecular weight of from 194 to 12,000, preferably from 400 to 3000. Polyoxyalkylene units and, more particularly, polyoxyethylene and/or polyoxypropylene units may also be present in the chain (in addition to the above-described structural units) in the polysiloxanes suitable for use in the present invention. The organofunctional polysiloxanes may be obtained by known methods. For example, hydroxymethyl polysiloxanes may be obtained by directly reacting bromomethyl polysiloxanes with alcoholic potassium hydroxide. 4-aminobutyl polysiloxanes may be produced by hydrogenation of the readily obtainable nitriles. Aminomethyl siloxanes may be produced by amination of the halogen methyl silicon compounds with ammonia or primary amines. In many cases, the functional groups are first introduced into low molecular weight siloxanes. The products thus obtained are then converted into relatively high molecular weight polysiloxanes by the known equilibration reaction.

Suitable organofunctional polysiloxanes are, for example, compounds corresponding to the formula $$H-X-Y-(Si(R)_2-O)_n-Si(R)_2-Y-X-H$$

in which

R represents a $C_1$–$C_4$ alkyl radical or a phenyl radical;

X represents —O—, —R'— (R'=an aliphatic or cycloaliphatic hydrocarbon radical containing up to 6 carbon atoms), —S—;

Y represents an alkylene radical containing from 2 to 4 carbon atoms or an oxyalkylene or polyoxyalkylene radical (alkylene=ethylene and/or propylene) obtained by removing a terminal oxygen atom and containing up to 50 oxyalkylene units; and n is an integer of from 1 to 100 (preferably from 5 to 29).

Specific examples of suitable organofunctional polysiloxanes are:

$$HO-CH_2Si(CH_3)_2-O[Si(CH_3)_2-O]_{12}-Si(CH_3)_2-CH_2OH$$

$$HO-\underset{\underset{CH_3}{|}}{CH}-CH_2-[Si(CH_2)_3-O]_{11}-Si(CH_3)_2-CH_2-O-\underset{\underset{CH_3}{|}}{CH}-CH_2-OH$$

$$HO-CH_2-Si(CH_3)_2-O-Si(CH_3)_2-CH_2-OH$$
$$HO-CH_2-Si(CH_3)_2-O-[Si(CH_3)_2-O]_{60}-Si(CH_3)_2-CH_2-OH \text{ and}$$

$$n\text{-}C_4H_9-NH-CH_2-Si(CH_3)_2-O-[Si(CH_3)_2-O]_{18}-\underset{\underset{CH_2-NH-n\text{-}C_4H_9}{|}}{Si(CH_3)_2}$$

The organopolysiloxanes which are particularly preferred correspond to the general formula

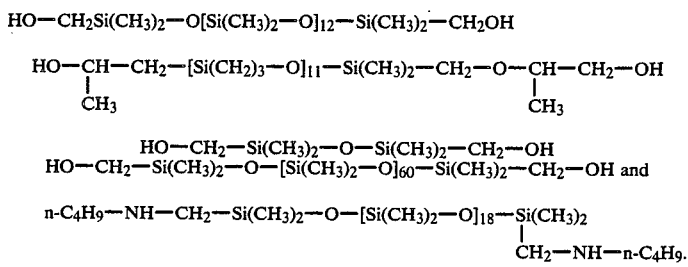

n = 5 to 29.

These preferred organopolysiloxanes may be produced in known manner by the equilibration of 1,1,3,3-tetramethyl-1,3-hydroxymethyl disiloxane corresponding to the formula

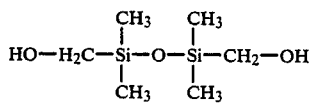

with octamethyl cyclotetrasiloxane in the presence of sulfuric acid or by the process described in German Auslegeschrift No. 1,236,505.

The NCO-prepolymers containing free isocyanate groups used in the practice of the present invention may be obtained in known manner by reacting the reactants in the melt or in solution. In either case, the equivalent ratio of NCO groups to active hydrogen atoms (preferably OH-groups) should be greater than 1, generally between 1.5:1 and 2.8:1. It is, of course, possible to use an even larger excess of polyisocyanate. The prepolymers generally have an oily to wax-like consistency, depending upon the starting components selected. If the NCO/OH-ratio is more than 2, non-extended prepolymers are generally obtained, whereas NCO/OH-ratios below 2 result in an increase in the average molecular weight of the prepolymers. When low molecular weight polyols are used in addition to relatively high molecular weight starting compounds as chain-extending agents in the production of the prepolymers, relatively high molecular weight prepolymers are obtained. The NCO-prepolymers thus obtained may be distilled to remove monomeric polyisocyanates, (e.g., with a thin-layer evaporator). However, in the process of the present invention, there is generally no need for distillation. It is possible by the process of the present invention to obtain products without any significant content of monomeric polyamines, even from NCO-prepolymers which have not been subjected to thin-layer evaporation (or otherwise freed from monomers). NCO-prepolymers produced from relatively high molecular weight polyether glycols, optionally using chain-extending agents and aliphatic and/or aromatic diisocyanates in an equivalent ratio of from 1:1.5 to 1:2.8 (preferably from about 1:1.5 to 1:2), are preferably used in the process of the present invention.

The NCO-prepolymers used in the present invention generally have an NCO-content of from 0.5 to 40 wt. %, preferably from 1.2 to 25 wt. % and, most preferably, from 1.5 to 15 wt. %.

However, so-called "semi-prepolymers", i.e. mixtures of NCO-prepolymers with other free polyisocyanates, which may have an even higher NCO content (for example up to 40 wt. %) may also be used in the process according to the invention, although they are generally less preferred.

The compounds containing free NCO-groups in the form of their modified isocyanates (generally free from urethane groups) or in the form of their NCO-prepolymers (containing urethane groups) or their "semi-prepolymers" have a total NCO-group content of from 0.5 to 40 wt. %, preferably from 1.2 to 25 wt. %, and, most preferably, from 1.5 to 15 wt. %. Allophanate, biuret or isocyanurate groups and uret dione groups may also be formed, depending upon the reaction conditions selected for production of the prepolymer. Where relatively high molecular weight "H-active compounds" (for example polyethers, polyacetals, polycarbonates, polythioethers, butadiene polymers or polydimethyl siloxanes) are used, ether, acetal, carbonate, thioether groups and also polybutadiene groups or dimethyl siloxane groups are also present in the prepolymer. Alkylene ether groups (preferably ethylene oxide and/or propylene oxide and/or tetramethylene oxide groups) are particularly preferred. Where amino compounds or water are used as starting materials in the production of the NCO-prepolymer, urea linkages may be present.

Polyamines modified by urethane groups and/or urea groups and/or thiourethane groups are obtained in the process of the present invention from the compounds containing free NCO-groups both by the NCO-hydrolysis reaction and by the reaction of the compounds containing "H-active groups" (preferably OH and/or amino and/or SH groups) with the NCO-compounds from that reaction. These modified polyamines may contain aromatic and/or aliphatic and/or cycloaliphatic primary amino groups, depending upon the particular use to which the compounds are to be put. These polyamines also contain urethane and/or urea and/or uretdione and/or isocyanurate and/or biuret groups and, optionally, ether and/or acetal and/or carbonate and/or thioether and/or dialkyl siloxane groups and/or the residues of polybutadienes which were in the NCO-compounds. However, additional bonds can be formed through secondary reactions. For example, urea groups can be formed from already hydrolyzed fractions and fresh NCO-compounds during the hydrolysis reaction. In the case of aliphatic NCO-compounds for example, this can occur as a secondary reaction. In the preferred embodiment of the process according to the invention, however, these secondary reactions are almost completely suppressed.

The quantity of $NH_2$-groups in the polyamines produced by the process of the present invention corresponds to the quantity of NCO-groups in the NCO-compounds minus the quantity of NCO-groups consumed by the reaction with the compounds containing H-active groups, i.e., approximately 0.1 to 20.2 wt. % $NH_2$, preferably 0.47 to 13.1 wt. % $NH_2$ and, most preferably, 0.5 to 6.1 wt. % of $NH_2$.

The process of the present invention is preferably used for the production of aromatic polyamines from aromatic NCO-compounds.

In the process of the present invention, the NCO-compound is used as starter component, generally without a solvent. However, solutions of NCO-compounds, particularly NCO-prepolymers, in water-miscible, NCO-inert solvents may also be used. Suitable solvents include dimethoxy ethane, diethylene glycol dimethyl ether, dioxane or tetrahydrofuran. Less suitable solvents are hydrocarbons, chlorinated hydrocarbons, lower aromatic compounds, chlorinated and/or nitrated aromatic compounds. However, the NCO-compounds are generally used in the form of solutions in the abovementioned solvents only when the NCO-compounds in question are solid NCO-prepolymers or NCO-prepolymers that are infusible, substantially infusible or highly viscous at temperatures in the range from 20° to 80° C. Where liquid NCO-compounds are used without a solvent, they may advantageously be used at a temperature of from 20° to 80° C. (preferably from 40° to 70° C.) to keep their viscosity low. Where the NCO-compounds are used in dissolved form, the preferred temperature range is from 20° C. to 40° C., but should not exceed the boiling point of the solvent used.

Where the NCO-compounds are used in the form of solutions, the NCO-compound may be used in a quantity of from 1 to 400 parts per 100 parts of solvent.

The mixing of the NCO-compound and the basic medium should preferably be carried out in a manner such that the temperature of the mixed reaction solution is as low as possible to prevent secondary reactions. The temperature prevailing in the reaction mixture of the components should be below 100° C., preferably between 0°–80° C. and, most preferably between 10° and 40° C. The temperature of the mixture is less critical in a continuous operation where the temperatures of the reactants are the same. It is, however, preferable that the temperature be between 20°–70° C. in such a continuous operation. To this end, the temperature of the basic, low-viscosity medium should be as low as possible before the reaction (for example in the range from −25° to +40° C., preferably in the range from 0° to 25° C.). In addition, the reaction mixture may be cooled during the reaction to keep the reaction temperature in the optimal range. However, the suitability of the reaction temperatures is also governed by the way in which the components are mixed and by the way in which the reaction is carried out.

A mixture or solution of water, bases and compounds containing NCO-active groups is generally used as the reaction medium in the process of the present invention. The minimum quantity of water is that which is stoichiometrically necessary to have 1 mole of water present for each mole of NCO-groups which are to be converted into $NH_2$-groups Suitable, sufficiently water soluble or dissolving "bases" include alkali hydroxides, alkaline earth hydroxides, alkaline earth oxides, low molecular weight alkali silicates and alkali-aluminates and tetra-alkyl ammonium hydroxides. Sodium and potassium hydroxide are particularly preferred.

Compounds containing "H-active groups" suitable for addition to the basic medium are any of the compounds containing hydroxy, amino and thiol groups which have already been mentioned as synthesis components for the NCO-compounds used in the process of the present invention.

Polyfunctional compounds containing hydroxy and/or primary amino groups are preferably used as the compounds containing "H-active groups" in the process of the present invention. Preferred compounds of this type are di- to tetra-functional compounds having a molecular weight of from 62 to about 2000. Those compounds containing at least 2 primary hydroxy groups such as ethane diol, 1,4-butane diol, 1,6-hexane diol, di-, tri- and tetra-ethylene glycol, trimethyl hexane diol, neopentyl glycol, polyethylene glycols, formitol mixtures, N-methyl diethanolamine, trimethylol ethane, trimethylol propane, adducts of ethylene oxide with, for example, trimethylol propane, triethanolamine, glycerol or pentaerythritol are particularly preferred.

Of the aminofunctional compounds, aromatic diamines and polyamines are preferred. The compounds containing mercapto groups as "H-active groups" are less preferred.

Mixtures of different compounds containing "H-active groups", which may differ in functionality, may of course also be used in the process of the present invention. Compounds containing only one NCO-reactive ("H-active") group, such as for example methanol, ethanol, the propanols, butanols (n-, sec.-, iso- and tert.-butanol), hexanols, cyclohexanol, primary butylamines, hexylamines, cyclohexylamine, stearylamine, aniline, naphthylamines, N,N-dimethyl hydrazine, N,N-dimethyl aminopropylamine and others, may be used in addition to difunctional and higher "H-active compounds". These monofunctional compounds are preferably used when more than difunctional NCO-prepolymers are to be converted into the polyamines because, as chain terminators, they reduce functionality.

It is possible, although less preferred, to use organic solvents which are preferably miscible with water (e.g., dioxane, tetrahydrofuran and dimethoxy ethane). For example, from 10 to 1000 parts of co-solvent may be used for each 100 parts of water.

The mixture of the base, water, the compounds containing at least 2 "H-active groups" and, optionally, the co-solvent or small quantities of optionally monofunctional "H-active compounds" is hereinafter referred to as the "basic medium".

The reaction of the NCO-compounds with the basic medium may be carried out in various ways. In one procedure, the compound containing NCO-groups is introduced into the basic medium. This may be done by means of a dropping funnel or by injection through a nozzle, provided that thorough dispersion of the reactants is achieved (e.g., by intensive stirring). The period over which the NCO-compounds are introduced into the basic medium depends upon the heat generated by the reaction. Provision should be made for cooling the reaction mixture to ensure that the temperature of the basic medium does not exceed the limits indicated above (i.e., in the batch procedure around 40° C., preferably 20° C.). This is particularly important in the case of trifunctional and higher NCO-prepolymers. In the case of a difunctional prepolymer, a brief rise in the temperature to around 60° to 70° C. is tolerable, although not preferred.

The ratio between the volume of basic medium and the volume of liquid to be introduced should normally be between about 10:1 and 1:3. Naturally, this ratio range does not apply when NCO-prepolymers are introduced in solid, but very finely powdered form (which is possible, although not preferred).

In a continuous process which is particularly suitable for large-scale production, NCO-compounds (optionally in the form of a solution) and the aqueous phase are delivered separately to a common reaction zone, intensively mixed (for example by means of a flow mixer), reacted, and rapidly discharged from the mixing zone. The components may be metered for example by means of graduated dropping funnels or by means of a piston and/or diaphragm metering pump or any other metering unit. In the case of continuous metering, it is preferred to mix, react and discharge the two components from the reaction zone very quickly (in seconds or fractions of a second) using suitable apparatus. Flow mixers suitable for use in accordance with the invention may be divided into static mixers (fixed baffles) and dynamic mixers (moving parts on the rotor/stator principle). They may be either heated or cooled. In the case of static mixers, the necessary mixing energy is generated by the pumps, whereas in the case of dynamic mixers a separate motor drives the rotor. In every case, the conversion of the isocyanate groups is dependent upon the power applied to the fine dispersion of the NCO-compound in the basic medium and the shear forces generated.

Static mixers which may be used in the present invention include: (a) mixers comprising simple fittings (for example the coil in the Static Mixer ® manufactured by Kenics Corp./USA); (b) multichannel mixers (for example the AMK-Ross-ISG-Mixer manufactured by the Aachener Misch- und Knetmaschinen-Fabrik, Federal Republic of Germany); (c) so-called packing mixers such as the static mixer manufactured by Sulzer AG, Winterthur/Switzerland, and the BMK-Mixer manufactured by Bayer AG, Federal Republic of Germany; (d) mixing nozzles, for example those manufactured by the Lechler Company of Stuttgart, Federal Republic of Germany, or the mixing chambers in the HK-machines manufactured by the Hennecke Company of Birlinghofen, Federal Republic of Germany, into which the starting components are injected under high pressure (counter-current injection).

Another suitable static mixer is the Inter mixer ® manufactured by the Sonic Company of Connecticut, USA, in which the material to be dispersed is sprayed onto a moving reed which begins to vibrate (approximately 500 Hz) and, in doing so, intensively disperses and mixes the product flowing through.

Dynamic mixers suitable for use in the process of the present invention are the flow mixers manufactured by Messrs. Ekato RMT (Schopfheim/Federal Republic of Germany), Lightnin (Neu-Isenburg/Federal Republic of Germany); Hennecke's Spiked stirrer which homogenizes like the known impellers such as the Supraton ® homogenizer manufactured by Messrs. Supraton Auer & Zucker OHG (Norf /Federal Republic of Germany) and the Dispax-Reaktor ® manufactured by Messrs. Janke & Kunkel KG (Staufen/Federal Republic of Germany), which operate on the stator-rotor principle, but cannot be used for delivery or transporting purposes. The energy necessary to achieve proper dispersion generally amounts to from 1 to more than 10 kW/1 mixer volume, depending upon the required degree of dispersion, the type of mixer used and the viscosity of the starting materials.

In general, the reaction components are delivered to the flow mixer at a temperature of from about $-25°$ to 40° C. The shear forces generated where dynamic mixers are used generally cause the reaction temperature to rise to approximately 50° to 150° C., depending on the heat generated by the reaction. In general, it is best to keep the temperature below 100° C. (if necessary, by cooling the mixing unit).

If other co-solvents are used, the temperature must be kept below the boiling points of the co-solvent if its boiling point is lower than that of water.

The reaction components are delivered to the flow mixer in as low-viscosity a form as possible and at the lowest possible temperature. The individual components may be heated or cooled to the temperatures indicated above. Under the effect of the intense shear forces generated where dynamic mixers are used, the temperatures prevailing in the mixing zone may rise considerably, depending on the heat generated by the reaction. In general, however, it is best to keep the temperature below 100° C., preferably below 60° C. and, most preferably, in the range from 20° to 40° C. (if necessary, by cooling the mixing unit). By virtue of the intense intermixing, rapid reaction and discharge of the reaction mixture formed, the temperature is not quite as critical in a continuous process as in a batch procedure. If other co-solvents are used, the temperature should best be kept below their boiling points. The quantitative equivalents of the alkali, alkaline earth and tetraalkylammonium hydroxides preferably used as bases amount to between 0.3:1 and 2:1, based on one NCO-group. Where the reaction is carried out continuously, solvents containing "H-active groups" such as isopropanol or t-butanol, may optionally be used.

The structure of the products obtained by the process of the present invention depends to a large extent upon the water:base:"H-active compound" (preferably containing two "H-active groups") ratio and its relationship to the NCO-compound. The products are also influenced to a considerable extent by process parameters such as the stirring speed.

If it is assumed that no compound containing "H-active groups" is present in the basic medium (although this does not correspond to the process according to the invention and is only mentioned here by way of explanation), a base:NCO-ratio of approximately 0.3:1 to 1:1 would be expected to give an amine-containing product which, with increasing base: NCO-ratio, contains fewer and fewer urea units and comes increasingly closer in its structure to the product obtained by complete conversion of all the NCO-groups into $NH_2$-groups. However, urea groups are formed for a base:NCO-ratio of $\geq 1$. Due to a number of factors (temperature, stirring speed, inhomogeneities in the distribution of base attributable to a buildup of viscosity, etc.), urea units are formed even with a base:NCO-ratio of $\geq 1$. Where monomer-free NCO-compounds are used, this results in pre-extension through urea groups (water extension). Where monomer-containing NCO-compounds are used, low molecular weight urea compounds form in addition to amine-containing products pre-extended through urea units. This pre-extension and formation of ureas is particularly likely in a batch operation. It has been found that the base: NCO-ratio beyond which there is virtually no further urea formation lies at around 1.15–1.30. For each equivalent of base, it is possible to use one equivalent of a compound containing "H-active groups", so that in approximate terms each NCO-group which is not converted into an $NH_2$-group reacts with an "H-active group". The compound containing "H-active groups" is preferably used in a quantity such that the ratio of the sum of the equivalents of base and compounds containing "H-active groups" to equivalents of isocyanate compound is approximately 1.15–1.30 (if urea formation is to be largely precluded), otherwise the ratio may be between 0.3 and 1.0. In principle, however, the ratio of the sum of the equivalents of base and H-active compound to equivalents of isocyanate may even be <0.3, although this is less preferred for pratical reasons.

The quantity of compounds containing "H-active groups" added or the ratio between compounds containing "H-active groups" and base is governed by the type of NCO-compounds used and by the reason for adding the compounds containing "H-active groups".

If the "H-active" compound is intended to prevent or greatly reduce the formation of low molecular weight polyamine from monomeric polyisocyanate in the production of an amine from an NCO-prepolymer still containing traces (e.g., 1 to 2 wt. %) of monomeric polyisocyanate, smaller quantities of compounds containing "H-active groups" are required than where an NCO-semiprepolymer (i.e., a mixture of NCO-prepolymer and $\geq 2\%$ wt. % of free diisocyanates) is to be converted into a mixture of several amines or than where a trifunctional or higher polyamine is to be produced from a linear diisocyanate compound by reaction with a trifunctional or higher compound containing "H-active groups". Similarly, less of this compound containing "H-active groups" will be required if it is intended to increase the functionality of the resulting amines with respect to the parent isocyanate compound (for example if an increase in functionality from 2.0 to 2.3 by the addition of trifunctional polyols is to be reduced, for example by the addition of monoalcohols). Generally, the ratio of base equivalents to H-active groups in the compounds containing "H-active groups" is in the range from 1:9 to 9.9:0.1, preferably from 1:4 to 9:1.

Various additives may be used to make it easier for the isocyanate groups to react with the aqueous base. Thus, one or more standard commercial emulsifiers may be used in quantities of from 0.01 to 1 part by weight per 100 parts of reaction mixture to promote homogenization.

Similarly, additives suited to the requirements of the intended application may be added to the basic medium. These additives may be (generally soluble) anti-static agents, anti-fouling agents, hydrophobizing agents, plasticizers, stabilizers, pigments, etc. However, these additives are preferably added after mixing of the basic medium with the NCO-compound.

After complete conversion of all the NCO-groups, it is possible (although generally not necessary and also less preferred) to add water or an organic water-miscible solvent before further treatment. Suitable solvents of this type are lower alcohols, such as methanol, ethanol, isopropanol, and ethers such as tetrahydrofuran, dioxane, dimethoxy ethane or diethylene glycol dimethyl ether.

According to the present invention, the compounds containing carbamate groups obtained by mixing the NCO-compounds with the basic medium are converted into compounds containing amino groups by subjecting the reaction mixture containing compounds comprising carbamate groups and urethane and/or urea and/or thiourethane groups and, optionally, other groups to: (1) treatment with an at least equivalent quantity (based on the quantity of base used) of a proton donor; or (2) heat treatment; or (3) extraction with a solvent in order to recover the amine-containing product. All three methods may be carried out either continuously or in batches. It is advantageous, especially in the method (2), to apply a vacuum which promotes the decomposition of the compounds containing carbamate groups. Any or all of these processes may, of course, be combined.

The treatment of the reaction mixture containing compounds having carbamate groups and urethane and/or urea and/or thiourethane groups (hereinafter referred to as the "carbamate mixture") with an at least equivalent quantity of a proton donor may be carried out with an acid fixed in an insoluble polymeric skeleton or with a liquid or soluble mineral or organic acid. Both methods may be combined (though such combination is not preferred) and they may each be carried out continuously or in batches.

In the first method for treating with a proton donor, acid ion exchangers suitable for use as the proton donor are any substances containing labile acid hydrogen atoms in an insoluble polymeric skeleton. Polymeric acids particularly suitable for use in the process according to the invention are ion exchange resins containing a styrene/divinyl benzene skeleton as the polymeric base to which sulfonic acid groups are attached as acid functions, and optionally polymeric acrylic acid containing COOH anchor groups.

In the process of the present invention, the carbamate mixture is combined with the ion exchanger. It is immaterial whether the acid ion exchange resin is added to the carbamate mixture or vice versa or whether the ion exchange resin and the carbamate mixture are separately delivered to a common reaction zone (in which case part of one of the reactants may be introduced beforehand). The ion exchange resin and the carbamate mixture are combined with one another at a rate which depends upon the intensity of the evolution of gas and with the dimensions of the apparatus (over a period from 10 to 300 minutes). Evolution of gas occurs only after the neutralization of any excess base.

When the two components are combined, there is little, if any, increase in temperature. A temperature range of from 10° to 70° C. (which may be adjusted by external heating) has been found to be favorable.

Ion exchanger is added to the carbamate mixture until there is no further evoluation of gas. Brief heating to 60°–100° C. drives out dissolved carbon dioxide. Equivalent or at least slightly excess quantities (preferably 1.01 to 1.8 equivalents of hydrogen ions released from the acid ion exchanger resin) are used for each equivalent of alkali.

The reverse procedure (i.e., ion exchanger introduced first) is preferred where the reaction is carried out continuously. At the end of the reaction, the reaction mixture is basic to the degree commensurate with the free amine content and its basicity.

The liquid phase containing the liquid or dissolved amine-containing product and the charged ion exchanger (solid phase) are separated from one another by filtration. The charged ion exchanger is preferably washed with a suitable solvent (for example, methanol, ethanol, dioxane) and the washing liquid combined with the first filtrate.

Removal of the solvent by distillation (for example at 17 mbar/100° C. and 0.1 to 1.3 mbar/100° C.) leaves the end products behind in the form of colorless to pale yellow liquids or pastes or crystalline solids.

In a continuous process, a stationary arrangement of polymeric acid material may be used. A suitable arrangement is a column (e.g., of glass) filled with acid ion exchange resin through which the carbamate mixture flows under pressure and/or gravity. The carbamate mixture may be flowed through such a column several times. The carbon dioxide which evolves must be let off by suitable ventilation. After the amine-containing product has completely formed, it is separated off from the product phase (for example by distillation). After decomposition of the carbamate mixture, the charged columns are washed (for example with methanol) and the resulting washing phase is optionally combined with the product phase. After this extraction, the ion exchange resin is regenerated by known methods.

It is advantageous to use an "ion exchange battery" in which the steps of acidolytic decomposition, solvent extraction and regeneration of the column material may be carried out simultaneously in separate, but interconnectable columns.

In the second method for treating the carbamate mixture with acids, a liquid or soluble organic or mineral acid is used. It is preferred to use exact equivalents of acid (based on the total quantity of base), although it is also possible to use an excess of acid, as described in German Offenlegungsschrift No. 2,948,419. There are two variations of this process. In the first modification, the carbamate reaction mixture is added dropwise to the acid component. The acids used are strong acids, such as aqueous mineral acids like hydrochloric acid, sulfuric acid, dilute nitric acid and phosphoric acid. It is also possible to use strong organic acids, such as oxalic acid, formic acid or acetic acid or equally strong organic acids. It is preferred to use hydrochloric acid and sulfuric acid. Sulfuric acid is particularly preferred. It is preferred that the acid initially introduced to the reaction vessel have a temperature of from 0° to 20° C. The carbamate reaction mixture should be introduced with stirring over a period of from 1 minute to 6 hours (preferably over a period of from 30 minutes to 2 hours). The temperature of the reaction mixture should be kept below 50° C. by external cooling. The period over which the carbamate is added depends upon the intensity with which gas is given off.

The acid/base equivalent ratio should be approximately 1:1, i.e. 1 equivalent of protons is used for each equivalent of base. The reaction mixture is then neutral to basic having the pH-value of a mixture of alkali salts or amine salts with an aromatic or aliphatic amino compound. The reaction mixture should then be stirred for 5 to 30 minutes at 20° C.

In the case of a liquid amino compound, the entire reaction mixture may be freed from volatile fractions by distillation (for example at 15 to 700 Torr and at a bath temperature of from 40° to 150° C.), separating off the salts precipitated by filtration (for example using a heatable pressure filter) and freeing the remaining amine-containing product from traces of volatile components (for example by treating over a period of 2 hours at 0.013 to 20 mbar/80° to 150° C.). If the amino compound is in solid form, it is filtered off and if necessary purified by standard methods, such as recrystallization or dissolution and reprecipitation.

In the third and preferred modification of the acid treatment of the carbamate mixture, the carbamate component and the acid component are separately delivered to a common reaction zone. It is preferable that they be delivered in such a way that equal equivalents of base and acid reach the reaction zone over the same period, thereby avoiding imbalances between the two reaction components. The reaction components may be metered through graduated dropping funnels or by means of a piston metering pump or any other metering unit.

The temperatures to be maintained and the way in which the reaction mixture is worked up are the same as those described above with respect to the first modification. In general, the reaction times are also the same as in the first modification. However, it is also possible (and in the case of a continuous process, preferred) to mix and react both components very quickly (in seconds or fractions of a second) using a suitable mixing machine. Where an excess of acid is used, working up is carried out in the same way as described in German Offenlegungsschrift No. 2,948,419.

In general, acid treatment of the carbamate mixture is less preferred than heat treatment or solvent extraction.

Hydrolysis of the carbamate groups into amino groups and salts of carbonic acid may be carried out by heat treatment at temperatures of up to about 200° C. The polyamines formed are those corresponding to the compounds containing carbamate groups. The heat treatment may be carried out continuously or in batches in the absence or presence of a vacuum.

In one embodiment of the present invention, the batch procedure is preferably carried out in the same reaction vessel in which the compounds containing carbamate groups were formed immediately after the production of those compounds. The reaction mixture containing compounds having carbamate groups is heated to ≧40° C., preferably to ≧60° C., most preferably to ≧80° C. and to at most around 200° C. over a period of up to 360 minutes, preferably over a period of from 5 to 180 minutes and, most preferably, over a period of from 30 to 120 minutes by means of a heat source having a temperature of from 60° to 200° C. and preferably in the range from 100° to 160° C. (for example steam or an oil bath and passage over heated plates or through heated tubes). The temperature range from about 60° to 100° C. and preferably 80° to 100° C. is particularly favorable. The temperature may be adjusted by refluxing excess water and any solvent present (optionally in vacuo). A little carbon dioxide may escape during this heat treatment, particularly near the end of the treatment.

Carbonic acid salts (such as differently hydrated carbonates and hydrogen carbonates of the bases used) are formed during the heat treatment. For example, potassium hydrogen carbonate, $KHCO_3$, can be formed. If the solvent component of the carbamate mixture which is subjected to the heat treatment carried out largely in the absence of a vacuum consists of water or mostly water with some organic solvent or some water and a larger amount of a solvent (for example methanol, dimethyl formamide) having a high salt dissolving power, the carbonic acid remains largely in solution. If the solvent component of the carbamate mixture subjected to the heat treatment consists to a lesser extent of water and to a larger extent of a solvent having a relatively weak salt dissolving power (for example n-butanol, i-butanol, tetrahydrofuran), some of the carbonic acid salts may precipitate and may be filtered off.

After the heat treatment, the solvent is distilled off. This may be done at atmospheric pressure or in a vacuum of, for example, from 0.2 to 950 mbar. The internal temperature depends upon the boiling points of the solvents used and the ratios in which they are mixed. It is preferable at atmospheric pressure to use temperatures between 80° and 100° C. and, where a vacuum is applied, between 40° and 60° C. In cases where only traces of volatile constituents remain, it is best to reduce the temperature to below 100° C. and to apply a vacuum, for example of from 0.01 to 6 mbar.

Residues of water may be removed from the mixture containing the amine product by the addition of solvent (for example, toluene) which forms an azeotrope with water, followed by re-distillation, optionally under reduced pressure. The carbonic acid salt may be separated off from the liquid polyamine-containing distillation residue by filtration, centrifuging, decantation or similar measures. Separation of the carbonic acid salt is preferably carried out by means of an optionally heatable pressure filter, under an excess pressure of from about 0.5 to 4 bars.

In many cases, it is also possible and advisable to carry out phase separation into an organic phase (containing the amine) and an aqueous phase (containing the salts and water) after the heat treatment and to separate the aqueous phase from the organic phase. During the subsequent distillation of the amine phase, less solvent (generally water) has to be distilled off, and the amount of salts to be filtered off is smaller so that filtration time may be significantly reduced.

If desired, the filter residue (optionally in combination with other filter residues of the same type) may be extracted with a suitable solvent (i.e., a solvent which dissolves the amine but does not dissolve the carbonic acid salt) to recover small residues of amine product. Examples of suitable solvents are halogenated (particularly chlorinated) alkanes such as trichloromethane, and liquid aromatic hydrocarbons such as toluene.

The batch heat treatment according to the present invention may also be carried out in several other ways. Specifically, it is possible and often preferred to carry out the above-described heat treatment (by which the carbamates are decomposed) at conditions under which water and other solvents, if any, distill off. The carbamate-containing reaction mixture may be heated for about 30 to 480 minutes to ≧40° C., preferably to ≧60° C. and, most preferably, to ≧80° C. by means of a heat source having a temperature of from 60° to 200° C. and preferably from 100° to 160° C., so that the solvent distills off during the heat treatment. This simultaneous heat treatment and distillation may optionally be carried out under reduced pressure such as 200 to 950 mbar. It may be carried out in such a way that the reduction in pressure is gradual and continuous. Thus, distillation may be commenced at atmospheric pressure and terminated at around 0.5 mbar.

In another modification, a solvent is added before the polyamine and carbonic acid salt are separated. This can be advisable when the viscosity of the mixture to be filtered off under suction is too high, or when the carbonic acid salts precipitated are too finely crystalline or when the precipitation of carbonic acid salts is incomplete. Suitable solvents are ethers such as dioxane; lower alkanes such as pentane, hexane; chlorinatd hydrocarbons such as dichloromethane, trichloroethane; and lower aromatic hydrocarbons, such as toluene and xylenes. After the salt and the amine have been separated (e.g., by filtration), the solvent used is distilled off from the amine solution. It is advantageous to use a solvent which is capable of forming an azeotrope (e.g., toluene).

In another modification of the heat treatment process, sub-equivalent quantities of acid (based on the equivalents of base used) such as from 0.01 to 0.99 equivalent of acid for each equivalent of basic compounds added, are mixed with the carbamate reaction mixture before or during its heat treatment. Suitable acids are sulfuric acid; hydrochloric acid; phosphoric acid; other acids which do not oxidize under the reaction conditions; strong organic acids such as formic acid, chloroacetic acid, acetic acid or other acids, preferably having a strength at least corresponding to that of acetic acid; and also acid ion exchangers. After the solvent has been distilled off, a mixture of carbonic acid salt and, for example, the sulfate, hydrogen sulfate, chloride, phosphoric acid salt etc., is filtered off. The temperature and pressure may, of course, be varied within the limits indicated above and a suitable solvent may be added before separation.

Carbon dioxide may advantageously be introduced before or at the beginning of the heat treatment. This is particularly advisable when a base/NCO-ratio of ≧1 has been used. Excess base is converted into a salt of carbonic acid. In other respects, the procedure is as described above.

In another modification of the heat treatment process, a compound which forms sparingly soluble salts with bases in a substantially anhydrous medium may be added (preferably before the heat treatment). This method may be of advantage in the production of products which are soluble in optionally water-containing salts of carbonic acid and only sparingly soluble in the solvent. Examples of such compounds which form salts with bases are carbonic acid esters such as the methyl or ethyl esters of formic, acetic, propionic or benzoic acid. These salt-forming compounds are preferably used in quantities such that all the hydroxide ions reach a reactive compound (such as a compound containing ester groups). It is preferred to use a small excess, although a relatively large excess may also be used. The heat treatment is carried out under the same conditions and the product recovered in the same way as described above. In addition to the salts of carbonic acid, acetates are precipitated where acetic acid esters are used. The alcohol component is distilled off during working up.

A continuous procedure for heat treating the carbamate mixture may be based on any one of the treatment methods described above. Preferably, the polyamine is continuously recovered by heat treatment of the carbamate reaction mixture after continuous production of that reaction mixture.

In principle, the continuous procedure comprises passing the reaction mixture (optionally liquefied by the addition of diluents) through a heating zone. The temperature and dimensions of the heating zone determine the duration of the heat treatment. The temperature of the heating zone is selected in such a way that the solvent is at least partly and preferably completely evaporated. The heating zone may optionally be operated under reduced pressure, for example under a reduced pressure of from 0.5 to 950 mbar, preferably under a reduced pressure of from 100 to 800 mbar. The heating zone should be at a temperature of from 60° to 200° C. and preferably from 100° to 160° C. Although the temperature of the heating zone may vary at different points thereof, the carbamate mixture to be decomposed should not be heated beyond 200° C. A simple heating zone of this type is a thin-layer evaporator.

If the heating zone does not contain any filters or other means for separating off the salts, the amine/salt mixture which forms may be separated by any of the methods described above with respect to the batch procedure.

The compounds containing carbamate groups may also be converted into the corresponding compounds containing amino groups (polyamines according to the invention) by treating the carbamate mixture with a suitable solvent.

Water-miscible organic solvents suitable for this purpose are those in which the compounds containing carbamate groups and the carbonic acid salts formed are insoluble and the amines formed are soluble. Specific examples of such solvents are dichloromethane, trichloromethane, tetrachloromethane, cyclohexane, methyl cyclohexane, pentane, hexane, benzene and toluene. Dichloromethane is particularly suitable. From 10 to 1000 parts, preferably from 20 to 500 parts and, most preferably, from 80 to 150 parts of the solvent are used per 100 parts of water in the carbamate mixture. The treatment is preferably carried out at 20° to 40° C., although it may be carried out at a higher temperature. The highest appropriate temperature is the boiling point of the solvent used. The necessary treatment and extraction time generally amounts to between about 1 hour and 3 days, preferably to between 2 hours and 1 day at room temperature. The length of time becomes shorter with increasing treatment temperature. The reaction is terminated when the aqueous phase and the organic phase are both clear and when the organic phase no longer foams on the addition of acid (ethanol for example, having been added beforehand to homogenize the phases). It is best that the reaction mixture be stirred during the treatment. On completion of the reaction, the two phases are mechanically separated from one another and the organic phase is freed from the organic solvent by distillation. Residual quantities of volatile constituents may be removed at 0.1 mbar/100° C.

In principle, it is also possible to use water-miscible solvents if they are poorer solvents for salts of carbonic acid than water. Solvents of this type are methanol, ethanol, n-propanol, i-propanol, n-butanol, i-amyl alcohol; cyclic ethers such as dioxane or tetrahydrofuran; water-soluble acyclic ethers, such as diethylene glycol dimethyl ether; or ketones such as acetone, methyl ethyl ketone and others. When such solvents are used, a two-phase system is obtained after conversion of the compound containing carbamate groups into a polyamine. The carbonic acid salt is concentrated in the aqueous phase and the amine is in the organic phase. Due to the mutual miscibility, however, the aqueous phase still contains fractions of the organic solvent and the amine while the organic phase contains fractions of salts and water. Consequently, after removal of the solvent by distillation, the organic phase must be filtered once again.

It is also possible to use a mixture of several organic solvents in the process of the present invention. The solvents should be selected so that the amine is soluble in both solvents while the compound containing carbamate groups is soluble in only one of the solvents. Lower alcohols may be used as the solvent in which the amine and the carbamate are soluble, while chlorinated aliphatic hydrocarbons may be used as the solvent in which only the amine is soluble.

Extraction may be carried out at atmospheric pressure, under reduced pressure or superatmospheric pressure, preferably at atmospheric pressure.

The extraction process may be modified by mixing the carbamate mixture before or during extraction with sub-equivalent quantities of acids (based on the quantity of base used), i.e. approximately 0.01 to 0.99 equivalent of acid per equivalent of base. This modification like the introduction of carbon dioxide is particularly suitable when a base/NCO-ratio of greater than 1:1 has been used. The modifications of the heat treatment method described above may also be adopted to the extraction process.

The above-described batch-type extraction process may be carried out in standard laboratory apparatus. The mixture may be stirred with the extraction solvents in a flask until clear phases are obtained. The phases may then be transferred to and separated in a separation funnel. However, it is also possible to use standard extractors for liquid/liquid mixtures of the type which use extractants of high or lower specific gravity than the material to be extracted. Extraction may be carried out continuously. In cases where the solvent used does not dissolve the compounds containing carbamate groups and forms a phase of relatively low specific gravity with the polyamine, the following procedure is particularly useful.

A vessel is continuously charged with carbamate mixture. A solvent which dissolves the free amine (but not the carbamate) is introduced with stirring from below, removed from the extractor (for example through an overflow), freed from amine by distillation and reintroduced into the extractor. The aqueous salt solution of higher specific gravity is run off from the bottom of the vessel, sodium hydroxide is added, the crystallizing carbonic acid salt is removed and the product is recirculated for reaction with the NCO-compounds.

Both in the continuous and the batch extraction processes, the amine may readily be obtained in pure form from the organic amine solutions by distillation of the solvents, optionally under reduced pressure. However, this is unnecessary in many cases because amines are used in the form of a solution in an organic solvent for a number of applications. For example, amine solutions are used in the production of coatings on textile fabrics, leather and other sheet-form materials. Where the amine is to be used in such applications, it is best to use a solvent during the production process which will also be compatible with the intended use.

In short, the most important methods for working up the carbamate mixtures into the (modified) polyamines of the present invention are: (1) addition of $\geq 1$ equivalent of a proton donor (based on the quantity of base) selected from the group comprising mineral acids, organic acids and acids fixed in an insoluble polymeric skeleton and, optionally, neutralizing excess quantities of acid; (2) thermal decomposition of the carbamate at temperatures of up to 200° C., optionally in the presence of solvents and in a vacuum; (3) extraction of the carbamate compound with a waterimmiscible organic solvent; (4) treatment of the carbamate with a sub-equivalent quantity of a proton donor, i.e. from 0.01 to 0.99 equivalent (based on the quantity of base used in the hydrolysis step) before or during the isolation steps to recover the polyamine from the compound containing carbamate groups. The polyamine is recovered by phase separation, crystallization or extraction (optionally plus removal of solvents by distillation) in all the cases described above.

The polyamines obtained in accordance with the present invention after removal of the solvents are generally colorless to faintly colored, medium-viscosity to high-viscosity and, optionally, relatively high melting products.

By virtue of their low vapor pressure, these polyamines are preferably used as reactants for optionally blocked polyisocyanates in the production of polyurethanes (polyurethane ureas), optionally cellular polyurethane plastics or polyurethane foams, for which purpose they may even be used in combination with other low molecular weight compounds (molecular weight from 32 to 399) and/or relatively high molecular weight compounds (molecular weight from 400 to about 12,000) containing isocyanate-reactive groups. Suitable starting components for the production of polyurethane plastics were mentioned previously with respect to production of prepolymers and are also mentioned in German Offenlegungsschriften Nos. 2,302,564; 2,432,764 (U.S. Pat. No. 3,903,679); 2,639,083; 2,512,385; 2,513,815; 2,550,796; 2,550,797; 2,550,833; 2,550,860 and 2,550,862. There are also references in these publications to auxiliaries and additives of the type which may optionally be used in the production of polyurethanes.

The present invention also relates to the production of polyurethane (ureas) using the polyamines produced in accordance with the invention. They may be used in making elastomers, coatings, filaments spun from melts, solutions, dispersions or mixtures of reactive components. Further uses for the polyamines produced in accordance with the invention are coupling components for diazo dyes, hardeners for epoxide and phenolic resins and any other known reactions involving amines, such as amide or imide formation and others.

The process according to the present invention is illustrated by the following Examples. Unless otherwise indicated, all the quantities given in these Examples represent parts by weight or percentages by weight.

EXAMPLES

Example 1 (Comparison Example)

(1a) Production of the NCO-prepolymer

An NCO-prepolymer was produced by heating to 80° C. from 600 g of a polypropylene glycol having an average molecular weight of 2000, 4.05 g of 1,4-butane diol and 104 g of 2,4-tolylene diisocyanate. The equivalent ratio of NCO-groups to polypropylene glycol-OH-groups to butane diol-OH-groups was 2:1:0.15. The NCO-prepolymer had an NCO-content of 3.2% (theoretical 3.03%).

(1b) Production of the carbamate mixture 51.2 g of a 50% potassium hydroxide solution (0.457 mole of KOH), 475 ml of water and 0.5 g of an emulsifier (Mersolat ® H, Bayer AG, Leverkusen, Federal Republic of Germany) were mixed. 500 g of the prepolymer of Example (1a) heated to 60° C. were introduced into this mixture over a period of 30 minutes at an internal temperature of 18° to 22° C. and then stirred for 30 minutes at that temperature. The NCO:OH$^\ominus$-equivalent ratio was 1:1.2.

(1c) Production of the polyamine

The carbamate mixture prepared in Example (1b) was stirred under reflux for 45 minutes at a bath temperature of 150° C. The water was subsequently distilled off in a water jet pump vacuum at a bath temperature of from 150° C. (at the beginning of distillation) to 100° C. (towards the end of distillation) and then at 0.13 mbar/100° C. The residue was taken up in 350 ml of toluene and the carbonic acid salt was filtered off under suction. The toluene-containing filtrate was freed from the solvent at 100° C./20 mbar and then at 100° C./0.13 mbar. The properties of the product polyamine are given in Table 1.

Example 2 (Comparison Example)

(2a) Production of the NCO-prepolymer

An NCO-prepolymer was produced from 600 g of a polypropylene glycol having an average molecular weight of 2000 and 104 g of 2,4-tolylene diisocyanate (NCO:OH-equivalent ratio 2:1) by heating for 3 hours to 80° C. 4.05 g of 1,4-butane diol were added to the NCO-prepolymer thus produced and the mixture kept at 80° C. for another hour. The equivalent ratio of NCO-groups to polypropylene glycol-OH-groups to 1,4-butane diol-OH-groups was 2:1:0.15. The NCO-prepolymer had an NCO-content of 3.03% [(theoretical 3.03%).

(2b) Production of the carbamate mixture

A mixture of 48.4 g of a 50% potassium hydroxide solution (0.432 mole of KOH), 475 ml of water and 0.5 g of Mersolat ® H was introduced into a reaction vessel. 500 g of the NCO-prepolymer of Example (1a)

heated to 60° C. were added with stirring over a period of 30 minutes at an internal temperature of 18° to 22° C., and stirred for 30 minutes at that temperature. The NCO:OH⊖-equivalent ratio was 1:1.2.

(2c) Production of the polyamine

The carbamate mixture of Example (2b) was stirred under reflux for 45 minutes at a bath temperature of 150° C. The water was then distilled off in a water jet pump vacuum at a bath temperature of from 150° C. (at the beginning of distillation) to 100° C. (towards the end of distillation) and then at 0.13 mbar/100° C. The carbonic acid salt was separated from the reaction product (temperature 80° C.) by filtration under suction. The properties of the product are given in Table 1.

Example 3 (Comparison Example)

(3a) Production of the NCO-prepolymer

An NCO-prepolymer having an NCO-content of 3.45% (theoretical 3.58%) was produced from 600 g of a polypropylene glycol having an average molecular weight of 2000 and 104 g of 2,4-tolylene diisocyanate by heating for 3 hours to 80° C. The equivalent ratio of NCO-groups to OH-groups was 2:1.

(3b) Production of the carbamate mixture

A mixture of 51.2 g of a 50% potassium hydroxide solution (0.457 mole); 475 ml of water and 0.5 g of Mersolat ® H was introduced into a reaction vessel. 500 g of the NCO-prepolymer of Example (3a) heated to 60° C. were then added with stirring over a period of 30 minutes at an internal temperature of 18° to 22° C. The mixture was then stirred for 30 minutes at 18°–22° C. The NCO:OH⊖ ratio was 1:1.2.

(3c) Production of the polyamine

The polyamine was produced in the same way as in Example (2c). The properties of the product are given in Table 1.

Example 4 (Comparison Example)

(4a) Production of the carbamate mixture

A mixture of 57.6 g of a 50% potassium hydroxide solution (0.514 mole), 475 ml of water and 0.5 g of Mersolat ® H was introduced into a reaction vessel. 500 g of a "thin-layered" NCO-prepolymer at 60° C. (produced from polypropylene glycol having an average molecular weight of 2000 and excess 2,4-tolylene diisocyanate) having an NCO-value of 3.6% (theoretical 3.5%) were added with stirring over a period of 30 minutes at an internal temperature of 18° to 22° C. The NCO:OH⊖ equivalent ratio was 1:1.2.

(4b) Production of the polyamine

The polyamine was produced by the same procedure that was used in Example (2c). The properties of the product are given in Table 1.

Example 5

(5a) Production of the carbamate mixture

A mixture of 55 g of a 50% potassium hydroxide solution (0.491 mole), 2.86 g of 1,4-butane diol (0.032 mole), 475 ml of water and 0.5 g of Mersolat ® H was introduced into a reaction vessel. 500 g of the NCO-prepolymer of Example (3a) heated to 60° C. were added with stirring over a period of 30 minutes at an internal temperature of from 18° to 22° C. This mixture was stirred for 30 minutes. The NCO:OH⊖ equivalent ratio was 1:1.2 and the OH (Butanediol)/OH⊖ (KOH) equivalent ratio was 0.13:1.

(5b) Production of the polyamine

The polyamine was produced by the same procedure that was used in Example (2c). The properties of the product are given in Table 1.

Example 6

(6a) Production of the carbamate mixture

A mixture of 45.92 g of a 50% potassium hydroxide solution (0.41 mole of KOH), 2.86 g of 1,4-butane diol (0.032 mole), 475 ml of water and 0.5 g of Mersolat ® H was introduced into the reaction vessel. 500 g of the NCO-prepolymer of Example (3a) heated to 60° C. were added with stirring over a period of 30 minutes at an internal temperature of 18° to 22° C. This mixture was then stirred for 30 minutes. The NCO:OH⊖ equivalent ratio was 1:1. The quantity of butane diol used was such that it corresponded to the quantity of 1,4-butane diol contained in 500 g of the NCO-prepolymer of Examples 1 and 2.

(6b) Production of the polyamine

The polyamine was produced by the same procedure that was used in Example (2c). The properties of the product are given in Table 1.

TABLE 1

|  | Example 1 (Comparison) | Example 2 (Comparison) | Example 3 (Comparison) | Example 4 (Comparison) | Example 5 | Example 6 |
|---|---|---|---|---|---|---|
| Yield (%) | 97 | 88 | 98 | 98 | 99 | 94 |
| NH—number (mg of KOH/g)[1] | 44.2 | 47.0 | 44.2 | 49.8 | 54.6 | 45.1 |
| Acid number (mg of KOH/g)[1] | 0.3 | 0.05 | 0.05 | 0.05 | 0.05 | 0.05 |
| Molecular weight[2] | 2600 | 2400 | 2700 | 2300 | 2100 | 2600 |
| Viscosity η 75° C. (mPa · s)[3] | —[8] | 443 | 417 | 294 | 316 | 394 |
| Primary nitrogen (%)[4] | 0.89 | 1.01 | 1.07 | 1.21 | 1.11 | 0.99 |
| Total nitrogen (%)[5] | 2.44 | 2.47 | 2.43 | 2.59 | 2.46 | 2.50 |
| Tolylene-2,4-diamine content (%)[6] | 0.077 | 0.113 | 0.74 | 0.27 | 0.450 | 0.207 |

TABLE 1-continued

|  | Example 1 (Comparison) | Example 2 (Comparison) | Example 3 (Comparison) | Example 4 (Comparison) | Example 5 | Example 6 |
|---|---|---|---|---|---|---|
| Water content (%)[7] | 0.04 | 0.11 | 0.07 | 0.07 | 0.10 | 0.09 |

[1] Determined by acetylation with acetanhydride and titration of the free acetic acid
[2] As determined by vapor pressure osmometry
[3] As determined by rotation viscosimetry
[4] As determined by titration with $HClO_4$
[5] As determined by Kjeldahl's method
[6] As determined by high-pressure liquid chromatography (HPLC)
[7] As determined by Karl Fischer's method
[8] Structural viscosity, $\eta^{75}$ at $T_{2.5}$: 2500 mPa · s, at $T_{50}$: 1500 mPa · s

Examples 7–10

These examples illustrate the dependence of diol modification of the polyamines on the NCO:base ratio.

Example 7

(7a) Production of the NCO-prepolymer

An NCO-prepolymer having an NCO-value of 3.4% was produced from 600 g of a polypropylene glycol having an average molecular weight of 2000 and 104 g of 2,4-tolylene diisocyanate by heating for 3 hours to 80° C.

(7b) Production of the carbamate mixture

A mixture of 45.4 g of 50% potassium hydroxide solution (0.404 mole of KOH), 2.7 g of 1,4-butane diol (0.03 mole), 480 ml of water and 0.5 g of Mersolat® H was introduced into the reaction vessel. 500 g of the NCO-prepolymer of Example (7a) heated to 65° C. were added with intensive stirring over a period of 30 minutes at an internal temperature of 17° to 20° C., followed by stirring for 30 minutes at that temperature. The equivalent ratio of NCO-groups to hydroxide groups to 1,4-butane diol-OH-groups was 1:1:0.15.

(7c) Production of the polyamine

The polyamine was produced by the procedure described in Example (2c). The properties of the product are set out in Table 2.

Example 8 (Comparison Example)

(8a) A mixture of 45.4 g of 50% potassium hydroxide (0.404 mole), 480 g of water and 0.5 g of Mersolat® H was introduced into the reaction vessel. 500 g of the NCO-prepolymer of Example (7a) heated to 65° C. were added with intensive stirring over a period of 30 minutes at an internal temperature of from 17° to 20° C., followed by stirring for 30 minutes at that temperature.

The equivalent ratio of NCO-groups to OH$^\ominus$ groups was 1:1.

(8b) Production of the polyamine

The polyamine was produced by the same procedure described in Example (2c). The properties of the product are set out in Table 2.

Example 9

A mixture of 61.2 g of 50% potassium hydroxide (0.546 mole), 2.7 g of 1,4-butane diol, 470 ml of water and 0.5 g of Mersolat® H was introduced into the reaction vessel. 500 g of the NCO-prepolymer of Example (7a) heated to 65° C. were added to this mixture over a period of 30 minutes at an internal temperature of from 17° to 20° C., followed by stirring for 30 minutes at that temperature. The equivalent ratio of NCO-groups to OH$^\ominus$-groups to 1,4-butane diol-OH-groups was 1:1.35:0.15.

The polyamine was produced by the procedure described in Example (2c). The properties of the prodduct are set out in Table 2.

Example 10 (Comparison Example)

A mixture of 61.2 g of 50% potassium hydroxide (0.546 mole of KOH), 470 ml of water and 0.5 g of Mersolat® H was introduced into the reaction vessel. 500 g of the NCO-prepolymer of Example (7a) heated to 65° C. were added to this mixture over a period of 30 minutes at an internal temperature of from 17° to 20° C., followed by stirring for 30 minutes at that temperature. The equivalent ratio of NCO-groups to OH$^\ominus$ groups was 1:1.35.

The polyamine was produced by the procedure described in Example (2c). The properties of the product polyamine are set out in Table 2.

TABLE 2

|  | Example 7 | Example 8 (Comparison) | Example 9 | Example 10 (Comparison) |
|---|---|---|---|---|
| Yield (%) | 95 | 95 | 99 | 94 |
| NH—number (mg of KOH/g)[1] | 27.8 | 31.6 | 43.4 | 48.4 |
| Acid number (mg of KOH/g)[1] | 0.4 | 0.4 | 0.4 | 0.3 |
| Molecular weight[2] | 4200 | 3900 | 2600 | 2600 |
| Viscosity $\eta^{75°\,C.}$ (mPa · s)[3] | paste | 2050 | 509 | 390 |
| Primary nitrogen (%)[4] | 0.54 | 0.70 | 1.0 | 1.10 |
| Total nitrogen (%)[5] | 2.44 | 2.47 | 2.46 | 2.46 |
| Water content (%)[7] | 0.2 | 0.02 | 0.04 | 0.08 |

(for indices, see Table 1)

Example 11

A mixture of 45.4 g of a 50% potassium hydroxide solution (0.405 mole), 480 ml of water, 4.8 g of trimethyl hexane diol (0.03 mole) and 0.5 g of Mersolat® H was introduced into the reaction vessel. 500 g of the NCO-prepolymer of Example (7a) heated to 50° C. were introduced into this mixture with stirring over a period of 30 minutes at an internal temperature of 22° to 26° C., followed by stirring for 30 minutes at that temperature.

The equivalent ratio of NCO-groups to OH⊖-groups to trimethyl hexane diol-OH-groups was 1:1:0.15. 750 ml of methanol were added to this carbamate mixture. 230 g of moist Lewatit ® SC 108 (Lewatit ® SC 108 is an acid ion exchanger, produced by Bayer AG. Leverkusen, Federal Republic of Germany) were added with stirring over a period of 15 minutes, after which the temperature was filtered off under suction while still hot, the filter residue was washed with 350 ml of methanol and the filtrate was combined with washing liquid. The volatile constituents were distilled off first at 100° C./20 mbar and then at 100° C./0.13 mbar.

| Product data: | |
|---|---|
| Yield (%) | 97 |
| NH—number (mg KOH/g)[1] | 40.5 |
| Acid number (mg KOH/g)[1] | 0.2 |
| Molecular weight[2] | 2700 |
| Viscosity $\eta$ 75° C. (mPas)[3] | 744 |
| Primary nitrogen (%)[4] | 0.90 |
| Total nitrogen (%)[5] | 2.42 |
| Water content (%)[7] | 0.04 |

(for indices, see Table 1)

Example 12

(12a) Production of the NCO prepolymer

An NCO-prepolymer produced from tolylene-2,4-diisocyanate and a polypropylene glycol ether having an average molecular weight of 2000 and having an NCO-content of 3.8% was used.

(12b) Production of the carbamate mixture

A mixture of 68.3 g of 50% sodium hydroxide solution (0.71 mole of KOH), 470 ml of water, 5.4 g of trimethyl hexane diol (33.9 mMole) and 0.5 g of Mersolat ® H was introduced into the reaction vessel. 500 g of the NCO-prepolymer of Example (12a) heated to 50° C. were added with stirring over a period of 40 minutes at an internal temperature of 22° to 26° C., followed by stirring for 30 minutes at that temperature. The equivalent ratio of NCO-groups to OH⊖-groups to trimethyl hexane diol-OH-groups was 1:1.35:0.15.

The polyamine was produced by the same procedure described in Example 11.

| Product data: | |
|---|---|
| Yield (%) | 98 |
| NH—number (mg KOH/g)[1] | 53.5 |
| Acid number (mg KOH/g)[1] | 0.05 |
| Molecular weight[2] | 2200 |
| Viscosity $\eta$ 75° C. (mPa · s)[3] | 323 |
| Primary nitrogen (%)[4] | 1.07 |
| Total nitrogen (%)[5] | 2.41 |
| TDA-content (%)[6] | 0.314 |
| Water content (%)[7] | 0.04 |

(1–7) see Table 1

Example 13

A mixture of 61.2 g of a 50% potassium hydroxide solution (0.546 mole of KOH), 470 ml of water, 30 g of a polypropylene glycol having an average molecular weight of 1000 (0.033 mole) and 0.5 g of Mersolat ® H was introduced into the reaction vessel. 500 g of the NCO-prepolymer of Example (7a) heated to 70° C. were added with stirring over a period of 30 minutes at an internal temperature of 20° to 24° C., followed by stirring for 15 minutes at that internal temperature. The equivalent ratio of NCO-groups to OH⊖-groups to polyether diol-OH-groups was 1:1.35:0.15.

The above described carbamate mixture was diluted with 250 ml of methanol to reduce its viscosity and then introduced into a suitable dropping funnel. In another dropping funnel, 26.75 g of sulfuric acid were diluted with water to a volume of 250 ml. The carbamate component and the acid component were introduced over a period of 20 minutes into a reaction vessel containing 150 ml of water as the stirring medium at such a rate that equal equivalents of acid and base (carbamate+excess potassium hydroxide) combined with one another during each unit of time. One half of this polyamine reaction mixture was freed from the volatile components at 100° C./20 mbar and then at 100° C./0.13 mbar. The salt component was then separated off by filtration.

A second half of the polyamine reaction mixture was transferred to a dropping funnel of suitable dimensions. After 2 hours, the aqueous phase was separated off and the organic phase was freed from volatile constituents by distillation at 20 mbar/100° C. and then at 0.2 mbar/100 Torr. The comparatively small amount of salt present in this part was separated off by filtration of the product mixture which had a temperature of 80° C.

| Product data: | First Part | Second Part |
|---|---|---|
| Yield (%) | 100 | 94 |
| NH—number (mg KOH/g)[1] | 45.4 | 43.9 |
| Acid number (mg KOH/g)[1] | 0.05 | 0.2 |
| Molecular weight[2] | 2400 | 2400 |
| Viscosity $\eta$ 75° C. (mPa · s)[3] | 392 | 410 |
| Primary nitrogen (%)[4] | 0.97 | 0.9 |
| Total nitrogen (%)[5] | 2.32 | 2.35 |
| Water content (%)[7] | 0.03 | 0.04 |

(1–5, 7) see Table 1.

Example 14

A mixture of 30.22 ml of a 45% sodium hydroxide solution (0.34 mole of NaOH), 480 ml of water, 14.5 g of an adduct of propylene oxide and trimethylol propane (TMP) having an OH number of 870 (75.5 mMole) and 0.5 g of Mersolat ® H was introduced into a reaction vessel. 500 g of the NCO-prepolymer of Example (12a) heated to 70° C. were added with stirring over a period of 30 minutes at an internal temperature of 25° to 30° C., followed by stirring for 20 minutes at that internal temperature. The equivalent ratio of NCO-groups to OH⊖-groups to TMP/propylene oxide-adduct-OH-groups was 6:4.5:3.

A first portion of the carbamate mixture was treated in the same way as is described in Example (2c).

Another (second portion) 500 ml of the abovedescribed carbamate mixture were worked up as follows:

In a 2 liter flask, the carbamate mixture and 750 ml of a 10:1 (by volume) mixture of toluene and ethanol were mixed, intensively stirred for 18 hours at room temperature and subsequently transferred to a separating funnel. After standing for 3 hours, the organic phase and aqueous phase were separated to such an extent that most of the aqueous phase could be separated off. The remaining extracted material was distilled (first at 20 mbar and then at 0.13 mbar/100° C.) and, finally, the carbonic acid salt component was filtered off under suction.

| Product data: | First Portion | Second Portion |
|---|---|---|
| Yield (%) | 96 | 89 |

-continued

| Product data: | First Portion | Second Portion |
|---|---|---|
| NH—number (mg KOH/g)[1] | 54.1 | 48.9 |
| Acid number (mg KOH/g)[1] | 0.2 | 0.05 |
| Molecular weight[2] | 2600 | 2600 |
| Viscosity $\eta$ 75° C. (mPas)[3] | 1150 | 1090 |
| Primary nitrogen (%)[4] | 0.72 | 0.69 |
| Total nitrogen (%)[5] | 2.38 | 2.41 |
| Water content (%)[7] | 0.11 | 0.04 |

(1–5, 7) see Table 1

Example 15

A mixture of 38 g of a 50% potassium hydroxide solution (0.34 mole), 480 ml of water, 5.8 g of the trimethylol propane/propylene oxide (TMP/PO) adduct of Example 14 (0.03 mole) and 0.5 g of Mersolat ® H was introduced into the reaction vessel. 500 g of the NCO-prepolymer of Example (12a) heated to 70° C. were added with stirring over a period of 30 minutes at an internal temperature of 25° to 30° C., followed by stirring for 20 minutes at that internal temperature. The equivalent ratio of NCO-groups to OH$^\ominus$-groups to TMP/PO-adduct-OH-groups was 1:0.75:0.20.

The polyamine was produced in accordance with the procedure described in Example (2c).

| Product data: | |
|---|---|
| Yield (%) | 94 |
| NH—number (mg KOH/g)[1] | 33.7 |
| Acid number (mg KOH/g)[1] | 0.2 |
| Molecular weight[2] | 3700 |
| Viscosity $\eta$ 75° C. (mPas)[3] | 3170 |
| Primary nitrogen (%)[4] | 0.64 |
| Total nitrogen (%)[5] | 2.42 |
| Water content (%)[7] | 0.07 |

(1–5, 7) see Table 1

Example 16

A mixture of 31 g of a 50% potassium hydroxide solution (0.34 mole), 480 ml of water, 11.2 g of triethanolamine (0.075 mole) and 0.5 g of Mersolat ® H was introduced into the reaction vessel. 500 g of the NCO-prepolymer of Example (12a) heated to 60° C. were added with stirring over a period of 30 minutes at an internal temperature of 22° to 25° C. The equivalent ratio of NCO-groups to OH$^\ominus$-groups to triethanolamine-OH-groups was 6:4.5:3.

The polyamine was produced in accordance with the procedure described in Example (2c).

| Product data: | |
|---|---|
| Yield (%) | 96 |
| NH—number (mg of KOH/g)[1] | 54.4 |
| Acid number (mg of KOH/g)[1] | 0.05 |
| Molecular weight[2] | 2500 |
| Viscosity $\eta$ 75° C. (mPas)[3] | 648 |
| Primary nitrogen (%)[4] | 0.96 |
| Total nitrogen (%)[5] | 2.59 |
| Water content (%)[7] | 0.05 |

(for indices, see Table 1)

Example 17

(17a) Production of the NCO prepolymer

An NCO prepolymer having an NCO-content of 2.1% was produced from a TMP-started polypropylene oxide/polyethylene oxide polyether predominantly containing primary OH-groups (OH number 28) and 2,4-diisocyanatotoluene by heating for 3 hours to 80° C.

(17b) Production of the carbamate mixture

A mixture of 38 g of a 50% potassium hydroxide solution (0.339 mole), 480 ml of water, 1.87 g of 1,4-butane diol (0.021 mole) and 0.5 g of Mersolat ® H was introduced into the reaction vessel. 500 g of the NCO prepolymer of Example (17a) heated to 60° C. were added with stirring over a period of 30 minutes at an internal temperature of 18° to 22° C. The equivalent ratio of NCO groups to OH$^\ominus$-groups to 1,4-butane diol-OH-groups was 1:1.35:0.15.

The polyamine was produced from this mixture by the procedure described in Example (2c). The properties of the product are presented in Example 18.

Example 18 (Comparison Example)

Example 18 was identical to Example 17 with the exception that no 1,4-butane diol was used.

| Product data: | Example 17 | Example 18 |
|---|---|---|
| Yield (%) | 98 | 96 |
| NH—number (mg of KOH/g)[1] | 32.5 | 22.2 |
| Acid number (mg of KOH/g)[1] | 0.05 | 0.5 |
| Molecular weight[2] | 6100 | 7400 |
| Viscosity $\eta$ 75° C. (mPas)[3] | 890 | 790 |
| Primary nitrogen (%)[4] | 0.65 | 0.54 |
| Total nitrogen (%)[5] | 1.33 | 1.34 |
| Water content (%)[7] | 0.03 | 0.02 |

(for indices, see Table 1)

Example 19

A mixture of 100 ml of water and 0.5 g of Mersolat ® H was prepared and introduced into the reaction vessel. The reactants were each introduced into one of two dropping funnels. In funnel A, 500 g of the NCO prepolymer of Example 17 tempered to 40° C. (250 mMole of NCO) were present. Funnel B contained 400 g of water, 26.88 g of a 50% potassium hydroxide solution (0.24 mole of KOH), 0.5 g of 1,4-butane diol and 6 g of n-propanol (0.12 mole) and was tempered to 5°–10° C. The contents of funnels A and B were introduced over a period of 30 minutes into the common reaction vessel tempered to 20°–25° C. at such a rate that the equivalent ratio was substantially maintained per unit of time. After the two components had been completely combined, they were stirred for 15 minutes at 20° to 25° C.

The polyamine was produced by the procedure described in Example (2c).

| Product data: | |
|---|---|
| Yield (%) | 94 |
| NH—number (mg of KOH/g)[1] | 14.7 |
| Acid number (mg of KOH/g)[1] | 0.05 |
| Molecular weight[2] | 6600 |
| Viscosity $\eta$ 75° C. (mPas)[3] | 560 |
| Primary nitrogen (%)[4] | 0.42 |
| Total nitrogen (%)[5] | 1.30 |
| Water content (%)[7] | 0.34 |

(for indices see Table 1)

Example 20

The reactants A and B were each introduced into one of two dropping funnels and a mixture of 100 ml of water and 0.5 g of Mersolat ® H was introduced into the reaction vessel. Funnel A contained 500 g of the NCO prepolymer of Example 17 (250 mMoles of NCO) at room temperature. Funnel B contained 400 g of water, 26.7 g of a 45% sodium hydroxide solution (0.3 mole), 200 ml of dioxane, 0.5 g of 1,4-butane diol and 6.7 g of stearyl amine (0.025 mole), at a temperature of 5°–10° C. The contents of funnels A and B were introduced into the common reaction vessel tempered to 10°–15° C. over a period of 30 minutes at a rate such that the equivalent ratio remained substantially constant per unit of time. After the two components had been combined, they were stirred for 30 minutes at 20° to 25° C.

After the volatile constituents had been distilled off in the manner described in Example (2c), the reaction mixture was first diluted with 450 ml of a 1:1 mixture of toluene and ethanol before filtration under suction to remove the carbonic acid salts.

| Product data: | |
|---|---|
| Yield (%) | 91 |
| NH—number (mg of KOH/g)[1] | 21.6 |
| Acid number (mg of KOH/g)[1] | 0.09 |
| Molecular weight[2] | 7000 |
| Viscosity η 75° C. (mPas)[3] | 810 |
| Primary nitrogen (%)[4] | 0.56 |
| Total nitrogen (%)[5] | 1.38 |
| Water content (%)[7] | 0.3 |

(for indices see Table 1)

Example 21

(21a) Production of the NCO prepolymer

A prepolymer was produced by reacting a trifunctional polyether polyol (trimethylol propane/propylene oxide) having an OH number of 56 with isophorone diisocyanate (IPDI) in a molar excess and removing the excess of IPDI. The NCO-prepolymer had an NCO-content of 3.7 wt. %.

(21b) Production of the carbamate mixture 100 ml of water and 0.5 g of Mersolat® H were introduced into the reaction vessel. The reactants were each kept in one of two dropping funnels. Funnel A contained 500 g of the NCO-prepolymer of Example (21a) (0.44 mole of NCO) at room temperature. Funnel B contained 400 g of water, 39.11 g of a 45% sodium hydroxide solution (0.44 mole of NaOH) and 17.47 g of 4,4′-diamino-3,3′-dimethyl dicyclohexyl methane (0.0734 mole).

The equivalent ratio of NCO-groups to OH⊖-groups to NH2-groups was 1:1:0.33. Funnel B was tempered at approximately 5° C. The contents of funnels A and B were introduced into the common reaction zone tempered at 5° to 10° C. over a period of 60 minutes at such a rate that the NCO component (A) and the NCO-reactive component were added to one another in a constant equivalent ratio during each unit of time. After the two components had been combined, they were stirred for 60 minutes at a temperature increasing from 5°–10° C. to approximately 20°–23° C.

Most of the volatile constituents were distilled off at an internal temperature of 50°–60° C./10 mbar. 200 ml of toluene were then added, followed by redistillation at 50°–60° C./10 mbar. 500 ml of ethanol were stirred into the viscous, paste-like residue which was then stirred for 2 hours at 20° to 25° C. After filtration, the ethanol was distilled off from the filtrate first at 10 mbar and then at 0.2 mbar.

| Product data: | |
|---|---|
| Yield (%) | 86 |
| NH—number (mg of KOH/g)[1] | 29 |
| Acid number (mg of KOH/g)[1] | 0.1 |
| Molecular weight[2] | 7400 |
| Viscosity η 75° C. (mPas) | paste |
| Primary nitrogen (%)[4] | 0.72 |
| Total nitrogen (%)[5] | 3.02 |

(indices see Table 1)

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of modified polyamines containing primary aromatic and/or aliphatic and/or cycloaliphatic amino groups comprising:
   (a) mixing
      (i) an organic isocyanate compound having an isocyanate content of from 0.5 to 40 wt. % with
      (ii) a base selected from the group of the oxides and hydroxides of 1. and 2. maingroup of the Periodic Chart of the Elements, low molecular weight alkali silicates and alkali aluminates and quarternary tetraalkylammonium hydroxides in the presence of
      (iii) at least one hydrogen-active compound containing a hydroxy and/or amino and/or thiol group and
      (iv) at least one mol of water for each isocyanate equivalent
   to form a reaction mixture in which carbamate, urethane and/or urea and/or thiourethane groups are present and
   (b) converting the carbamate, urethane and/or urea and/or thiourethane group present in the reaction mixture to amino groups.

2. The process of claim 1 wherein step (b) is carried out by treating the reaction mixture with a proton donor and the polyamine thus-formed is removed from the mixture.

3. The process of claim 1 wherein step (b) is carried out by heat treating the reaction mixture and the polyamine thus-formed is removed from the mixture.

4. The process of claim 1 wherein step (b) is carried out by solvent extraction.

5. The process of claim 1 wherein the organic isocyanate compound is a polyfunctional isocyanate prepolymer of a polyisocyanate with a relatively high molecular weight polyhydroxyl compound.

6. The process of claim 5 wherein the relatively high molecular weight polyhydroxyl compound is selected from the group consisting of polyethers, polycarbonates, polyacetals, polythioethers, polysiloxanes and polybutadienes having molecular weights of from 400 to 12,000 and mixtures thereof.

7. The process of claim 6 wherein polyfunctional chain extending agents containing hydrogen-active groups and having a molecular weight in the range from 18 to 399 are included in the prepolymer.

8. The process of claim 1 wherein the base (ii) is selected from the group consisting of alkali hydroxides, alkaline earth hydroxides, tetraalkyl ammonium hydroxides, low molecular weight alkali silicates and alkali aliminates and mixtures thereof.

9. The process of claim 8 wherein the base and the compound containing a hydroxy and/or amino and/or thiol group are used in quantities such that the ratio of base plus the hydroxy and/or amino and/or thiol group containing compound to isocyanate groups is from 0.3:1 to 2:1.

10. The process of claim 9 wherein an NCO-inert solvent is employed during mixing step (a).

11. The process of claim 1 wherein the hydroxy and/or amino and/or thiol group containing compound has from 2 to 4 H-active groups and a molecular weight of from 60 to 2000.

12. The process of claim 1 wherein a polyhydroxyl compound containing from 2 to 4 primary OH groups are used as compound (iii).

13. The process of claim 1 wherein the equivalent ratio of base to hydrogen-active groups is between 1:9 and 9.9:0.1.

* * * * *